(12) United States Patent
Aruga et al.

(10) Patent No.: US 11,046,429 B2
(45) Date of Patent: Jun. 29, 2021

(54) HEAD MOUNTED DISPLAY AND METHOD FOR MANEUVERING VEHICLE

(71) Applicant: SEIKO EPSON CORPORATION, Tokyo (JP)

(72) Inventors: Naoto Aruga, Okaya (JP); Yuichi Mori, Minowa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 472 days.

(21) Appl. No.: 15/925,381

(22) Filed: Mar. 19, 2018

(65) Prior Publication Data
US 2018/0281950 A1 Oct. 4, 2018

(30) Foreign Application Priority Data

Mar. 28, 2017 (JP) .............................. JP2017-062099
Oct. 31, 2017 (JP) .............................. JP2017-209970

(51) Int. Cl.
*B64C 39/02* (2006.01)
*G01S 19/14* (2010.01)
(Continued)

(52) U.S. Cl.
CPC ............ *B64C 39/024* (2013.01); *G01S 19/14* (2013.01); *G01S 19/48* (2013.01); *G01S 19/49* (2013.01);
(Continued)

(58) Field of Classification Search
None
See application file for complete search history.

(56) References Cited

U.S. PATENT DOCUMENTS 9,201,422 B2 * 12/2015 Ohtomo ............... G01C 15/002
2017/0132474 A1 * 5/2017 Matsumoto ........ H04N 5/23296
(Continued)

FOREIGN PATENT DOCUMENTS

JP 2008-304260 A 12/2008
JP 2014-062789 A 4/2014
(Continued)

OTHER PUBLICATIONS

Susuki, K. et al., "Study on Depth Model of Landscape Based on Depth Perception Sensitivity of Human Vision", Forum on Information Technology 2013, vol. 12, No. 3, pp. 335-336.

*Primary Examiner* — Aniss Chad
*Assistant Examiner* — Mahmoud M Kazimi
(74) *Attorney, Agent, or Firm* — Oliff PLC

(57) ABSTRACT

A head mounted display capable of controlling maneuver of an unmanned vehicle, the head mounted display including a display section that allows visual recognition of an outside scene, a GNSS information acquisition section that acquires a GNSS information, a communication section capable of performing communication using wireless communication with the unmanned vehicle, and a control section, wherein the control section evaluates whether or not the unmanned vehicle has entered a visual field visually recognizable through the display section in a case where the unmanned vehicle travels in an automatic navigation mode in which the unmanned vehicle moves toward a position indicated by the GNSS information and causes the unmanned vehicle to terminate the travel in the automatic navigation mode but travel in a specific navigation mode different from the automatic navigation mode in a case where the control section determines that the unmanned vehicle has entered the visual field.

23 Claims, 27 Drawing Sheets

(51) Int. Cl.
*G05D 1/00* (2006.01)
*G01S 19/48* (2010.01)
*G02B 27/01* (2006.01)
*G01S 19/49* (2010.01)
*G06F 3/01* (2006.01)
*G05D 1/10* (2006.01)

(52) U.S. Cl.
CPC ....... *G02B 27/017* (2013.01); *G02B 27/0172* (2013.01); *G05D 1/0016* (2013.01); *G05D 1/0033* (2013.01); *G06F 3/011* (2013.01); *B64C 2201/14* (2013.01); *G02B 2027/0138* (2013.01); *G02B 2027/0141* (2013.01); *G02B 2027/0178* (2013.01); *G05D 1/0088* (2013.01)

(56) References Cited

U.S. PATENT DOCUMENTS

2019/0075252 A1* 3/2019 Zhao ................. H04N 7/185
2019/0104496 A1* 4/2019 Sogo ................. H04W 4/80
2019/0220002 A1* 7/2019 Huang ................. G06T 7/70

FOREIGN PATENT DOCUMENTS

| JP | 2015-145784 A | 8/2015 |
|---|---|---|
| JP | 5979458 B1 | 8/2016 |

* cited by examiner

HEAD MOUNTED DISPLAY AND METHOD FOR MANEUVERING VEHICLE

BACKGROUND

1. Technical Field

The present disclosure relates to maneuvering an unmanned vehicle by using a head mounted display.

2. Related Art

In recent years, development of an unmanned aircraft called a drone capable of remote maneuver or autonomous flight has been advancing. An unmanned aircraft of related art, for example, incorporates a GNSS receiver, which receives a GNSS electric wave to acquire GNSS information, as described in JP-A-2008-304260. The unmanned aircraft can estimate the attitude and position of the airframe based on the GNSS information. The unmanned aircraft can be maneuvered with not only a dedicated remote control apparatus but a smartphone, a tablet, and other apparatuses.

It is conceivable to cause the unmanned aircraft to automatically travel to a destination by using the GNSS information. However, since the position information contained in the GNSS information has a relatively large error of several to several tens of meters, the unmanned aircraft of related art cannot travel to the destination with accuracy in some cases. The error in the position information increases, for example, in a mountainous area, an intermontane area, and an area between buildings, and the unmanned aircraft therefore undesirably reaches a point far away from the destination in some cases. It has therefore been desired to develop an apparatus that maneuvers an unmanned aircraft based on a technology that allows the unmanned aircraft to travel to a destination with accuracy. The object described above is not limited to an unmanned aircraft and common to a variety of vehicles on which no pilot is present but which are remotely maneuvered or automatically operated (that is, unmanned vehicles).

SUMMARY

An aspect of the present disclosure is directed to a head mounted display capable of controlling maneuver of an unmanned vehicle, the head mounted display including a display section that allows visual recognition of an outside scene, a GNSS information acquisition section that acquires GNSS information, a communication section capable of performing communication using wireless communication with the unmanned vehicle, and a control section, and the control section evaluates whether or not the unmanned vehicle has entered a visual field visually recognizable through the display section in a case where the unmanned vehicle travels in an automatic navigation mode in which the unmanned vehicle moves toward a position indicated by the GNSS information acquired by the GNSS information acquisition section and causes the unmanned vehicle to terminate the travel in the automatic navigation mode but travel in a specific navigation mode different from the automatic navigation mode in a case where the control section determines that the unmanned vehicle has entered the visual field. Therefore, according to the aspect described above, the travel in the automatic navigation mode using low-accuracy GNSS information can be terminated, whereby the unmanned vehicle is allowed to travel to the destination with accuracy.

In the aspect described above, the head mounted display may further include a camera that captures an image of the visual field, and the control section may acquire the image captured with the camera and perform pattern matching between a target image prepared in advance to identify the unmanned vehicle and the captured image to evaluate whether or not the unmanned vehicle has entered the visual field. According to the aspect with the configuration described above, whether or not the unmanned vehicle has entered the visual field visually recognizable through the display section can be evaluated with accuracy.

In the aspect described above, the GNSS information acquisition section may include a GNSS receiver that receives the GNSS information, and the automatic navigation mode may be a navigation mode that allows the unmanned vehicle to home to the head mounted display. According to the aspect with the configuration described above, the unmanned vehicle is allowed to home to the head mounted display with accuracy.

In the aspect described above, the GNSS information acquisition section may receive the GNSS information from a GNSS receiver provided in a position separate from the head mounted display. According to the aspect with the configuration described above, in a case where the unmanned vehicle travels in the automatic navigation mode toward the position where the GNSS receiver is installed, the navigation mode can be switched to the specific navigation mode so that the unmanned vehicle can travel to the destination with accuracy.

In the aspect described above, the head mounted display may further include a radio wave receiver that receives a radio wave sent from the unmanned vehicle, and the specific navigation mode may be a mode in which intensity of the radio wave received by the radio wave receiver is measured and a travel route is specified from a change in the measured intensity. Since the navigation mode based on the intensity of the radio wave allows high-accuracy navigation, the display in the aspect with the configuration described above allows travel to the destination with accuracy.

In the aspect described above, the unmanned vehicle may include an inertial sensor that detects motion of an airframe and successively accumulate a detection value from the inertial sensor to determine a position of the airframe, and the specific navigation mode may be a mode in which the head mounted display acquires the position of the airframe determined by the unmanned vehicle and a travel route is specified from the acquired position of the airframe. The display in the aspect with the configuration described above allows the travel to the destination with accuracy.

In the aspect described above, the inertial sensor may be a first inertial sensor, the head mounted display may further include a second inertial sensor that detects motion, and the specific navigation mode may be a mode in which the head mounted display successively accumulates a detection value from the second inertial sensor to determine a position of the head mounted display and the travel route is specified from the determined position of the head mounted display and the acquired position of the airframe. According to the aspect with the configuration described above, the unmanned vehicle can home to the head mounted display with higher accuracy.

In the aspect described above, the head mounted display may further include an operation section that instructs, when operated by a user, the unmanned aircraft about motion thereof, and the specific navigation mode may be a mode in which the head mounted display specifies a travel route in accordance with the instruction issued to the operation section. According to the aspect with the configuration described above, the unmanned vehicle can home to the head mounted display with higher accuracy.

In the aspect described above, the display section may be a display section that allows see-through visual recognition of an outside scene, and the control section may cause the display section to display an operation screen for the operation section, estimate a position of the unmanned vehicle on the display section when the control section determines that the unmanned vehicle has entered the visual field, and move the operation screen to a position separate from the estimated position. According to the aspect with the configuration described above, the operation screen does not hide the unmanned vehicle in the user's visual field, whereby the operability of homing action of the unmanned vehicle can be improved.

In the aspect described above, the communication section may acquire an unmanned vehicle image that is an image captured by the unmanned vehicle from the unmanned vehicle over wireless communication, the display section may be a display section that allows see-through visual recognition of an outside scene, perform display operation in a first aspect in a case where a maneuver distance that is a distance from the head mounted display to the unmanned vehicle is greater than a second distance, perform display operation in a second aspect in a case where the maneuver distance is smaller than the second distance but greater than or equal to a first distance, and perform display operation in a third aspect in a case where the maneuver distance is smaller than the first distance, and the display operation in the first, second, and third aspects may include displaying the unmanned vehicle image. According to the aspect with the configuration described above, the display operation including displaying the unmanned vehicle image can be changed in accordance with the maneuver distance.

In the aspect described above, an area in which the unmanned vehicle image is displayed in the display operation in the second aspect may be narrower than an area in which the unmanned vehicle image is displayed in the display operation in the first aspect. According to the aspect with the configuration described above, in the case where the maneuver distance is smaller than the second distance, that is, in a case where the unmanned vehicle is close to the user, the unmanned vehicle is readily visually recognized through the display section.

In the aspect described above, the display operation in the first aspect may include displaying an object showing that the display operation in the first aspect is performed, the display operation in the second aspect may include displaying an object showing that the display operation in the second aspect is performed, and the display operation in the third aspect may include displaying an object showing that the display operation in the third aspect is performed. According to the aspect with the configuration described above, the user can recognize the aspect in accordance with which the image viewed by the user is displayed.

In the aspect described above, the control section may set at least one of the first and second distances based on a relationship between the unmanned vehicle and a background color of surroundings of the unmanned vehicle. According to the aspect described above, at least one of the first and second distances can be set in accordance with the visibility of the unmanned vehicle.

In the aspect described above, the maneuver distance being smaller than or equal to the first distance may be a necessary condition of determination of entry of the unmanned vehicle into the visual field visually recognizable through the display section, and the control section may instruct the unmanned vehicle to hover in a current position until the travel in the specific navigation mode starts in a case where the travel in the automatic navigation mode shortens the maneuver distance from a distance greater than the first distance to the first distance. According to the aspect with the configuration described above, when the automatic navigation mode is switched to the specific navigation mode, a temporal margin can be provided.

In the aspect described above, the control section may instruct the unmanned vehicle to travel in the automatic navigation mode so that the maneuver distance is shortened in a case where the maneuver distance increases from a distance smaller than or equal to the first distance to a distance greater than the first distance. According to the aspect with the configuration described above, in a case where the maneuver distance becomes greater than the first distance after the navigation mode is once switched to the specific navigation mode, the navigation mode can be automatically switched to the automatic navigation mode.

In the aspect described above, the unmanned vehicle may be formed of a plurality of unmanned vehicles, and the control section may be capable of instructing the plurality of unmanned vehicles about the navigation mode. According to the aspect with the configuration described above, one head mounted display can be used to maneuver a plurality of unmanned aircrafts.

In the aspect described above, the head mounted display may further include an operation section that instructs, when operated by a user, the unmanned aircrafts about motion thereof, the control section may cause the display section to display an operation screen for the operation section, the specific navigation mode may be a mode in which the head mounted display specifies a travel route in accordance with the instruction issued to the operation section, and in a case where there are a plurality of unmanned vehicles each satisfying a condition that the maneuver distance is smaller than or equal to the first distance, the control section may select one of the plurality of unmanned vehicles as a selected vehicle that is an unmanned vehicle the travel route of which is specified in accordance with the instruction issued to the operation section. According to the aspect with the configuration described above, the plurality of unmanned vehicles can be maneuvered one by one.

In the aspect described above, the control section may instruct, out of the unmanned vehicles each satisfying the condition that the maneuver distance is smaller than or equal to the first distance, unmanned vehicles other than the selected vehicle to hover. According to the aspect with the configuration described above, the plurality of unmanned vehicles can be maneuvered one by one.

In the aspect described above, the control section may instruct, out of the unmanned vehicles each satisfying the condition that the maneuver distance is smaller than or equal to the first distance, unmanned vehicles other than the selected aircraft to follow the selected aircraft. According to the aspect with the configuration described above, the plurality of unmanned aircrafts can be concurrently maneuvered.

In the aspect described above, the display section may display an image for distinguishing the selected vehicle from unmanned vehicles other than the selected vehicle as the display operation in the third aspect. According to the aspect with the configuration described above, which of the unmanned vehicles is maneuvered is readily grasped.

In the aspect described above, the unmanned vehicles other than the selected vehicle may include an unmanned vehicle to be maneuvered by the head mounted display and an unmanned vehicle not to be maneuvered by the head mounted display, and the display section may display an image for distinguishing the unmanned vehicle to be maneuvered by the head mounted display from the unmanned vehicle not to be maneuvered by the head mounted display as display operation in the third aspect. According to the aspect with the configuration described above, which of the unmanned vehicles is a target to be maneuvered and which of the unmanned vehicles is not a target to be maneuvered are readily grasped.

In the aspect described above, the control section may accept from a user an input of a destination in the specific navigation mode and instruct the unmanned vehicle to head toward the destination. According to the aspect with the configuration described above, the unmanned vehicle is allowed to head toward an arbitrary destination.

The present disclosure can also be achieved in a variety of forms other than the head mounted display. For example, the present disclosure can be achieved, for example, in the form of a method for maneuvering an unmanned vehicle, a method for controlling the head mounted display, a computer program for achieving the function of each component provided in the head mounted display, and a storage medium that stores the computer program.

BRIEF DESCRIPTION OF THE DRAWINGS

The present disclosure will be described with reference to the accompanying drawings, wherein like numbers reference like elements.

DESCRIPTION OF EXEMPLARY EMBODIMENTS

A. First Embodiment

Figure 1:
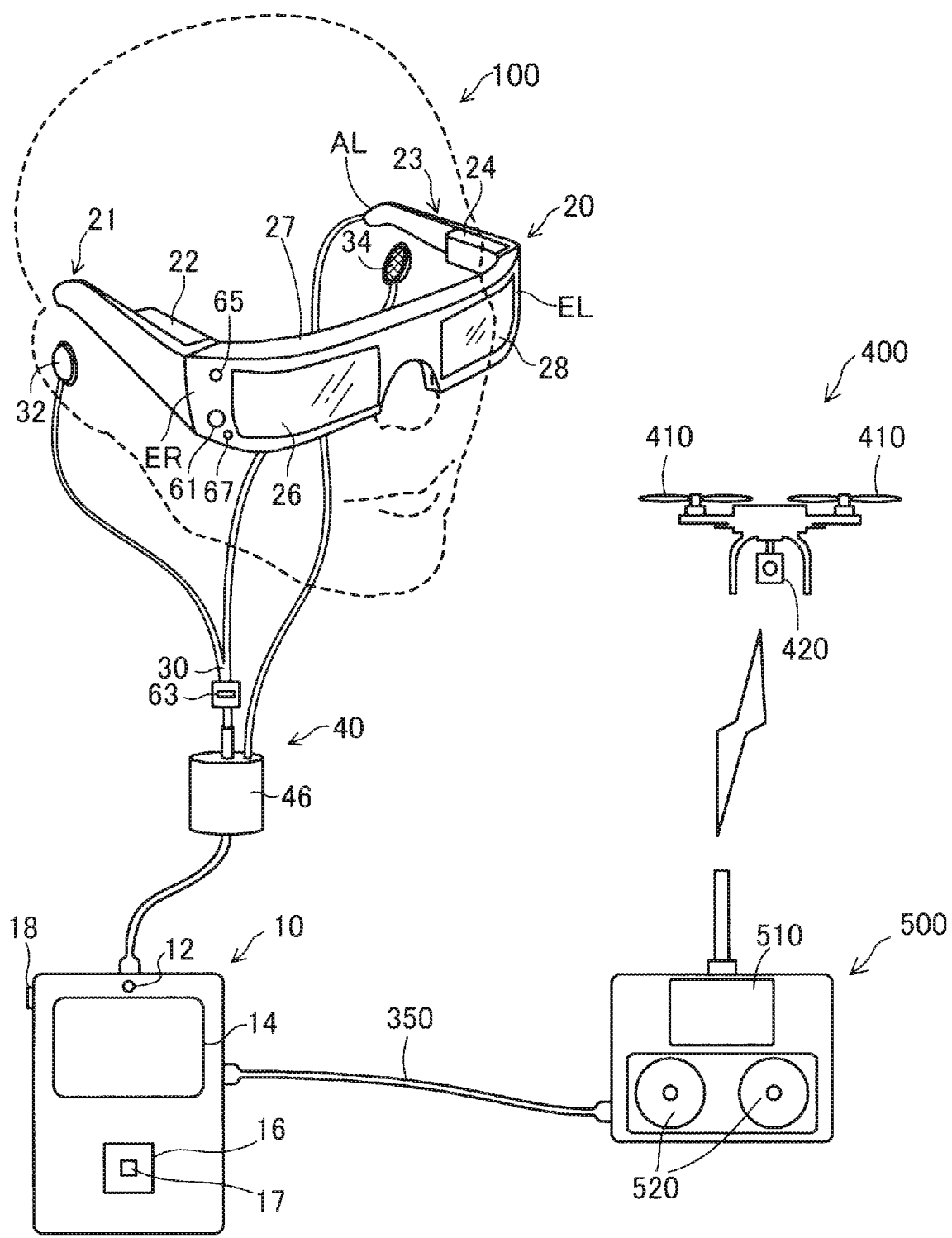
FIG. 1 is a descriptive diagram showing a schematic configuration of an unmanned aircraft system including a head mounted display.

A-1. Overall Configuration:

FIG. 1 is a descriptive diagram showing a schematic configuration of an unmanned aircraft system including a head mounted display in a first embodiment. The unmanned aircraft system includes a head mounted display 100, an unmanned aircraft 400, and a remote control apparatus 500.

The unmanned aircraft 400 incorporates a GNSS (global navigation satellite system) receiver, an IMU (inertial measurement unit) sensor, and other components and can fly with unmanned aircraft 400 grasping the attitude and position of the airframe with the GNSS receiver, the IMU sensor, and the other components. The unmanned aircraft 400 is what is called a drone. The remote control apparatus 500 is an apparatus that remotely maneuvers the unmanned aircraft 400. The unmanned aircraft 400, which is remotely maneuvered with the remote control apparatus 500, is also capable of autonomous flight. The headmounted display 100 is connected to the remote control apparatus 500 via a USB cable 350. The head mounted display 100 allows maneuver of the unmanned aircraft 400 via the remote control apparatus 500. The configuration of the head mounted display 100 will first be described in detail.

A-2. Configuration of Head Mounted Display:

The head mounted display 100 is a display mounted on a user's head and is also called an HMD. The HMD 100 is a see-through-type (transmissive) head mounted display that displays a floating image in the outside visually recognized through a glass plate. The HMD 100 includes an image display section 20, which allows the user to visually recognize an image, and a control apparatus (controller) 10, which controls the image display section 20.

The image display section 20 is a mountable part mounted on the user's head and has a glasses-like shape in the present embodiment. The image display section 20 corresponds to a "display section." The image display section 20 includes a support formed of a right holder 21, a left holder 23, and a front frame 27, and the main body includes a right display unit 22, a left display unit 24, a right light guide plate 26, and a left light guide plate 28.

The right holder 21 and the left holder 23, which extend rearward from the opposite ends of the front frame 27, hold the image display section 20 on the user's head, as the temples (bows) of glasses do. Out of the opposite ends of the front frame 27, the end located on the right of the user on whom the image display apparatus 20 is mounted is called an end ER, and the end located on the left of the user is called an end EL. The right holder 21 is so provided as to extend from the end ER of the front frame 27 to a position corresponding to a right temporal region of the user on whom the image display section 20 is mounted. The left holder 23 is so provided as to extend from the end EL of the front frame 27 to a position corresponding to a left temporal region of the user on whom the image display section 20 is mounted.

The right light guide plate 26 and the left light guide plate 28 are provided as part of the front frame 27. The right light guide plate 26 is located in front of the right eye of the user on whom the image display section 20 is mounted and allows the right eye to visually recognize an image. The left light guide plate 28 is located in front of the left eye of the user on whom the image display section 20 is mounted and allows the left eye to visually recognize an image.

The front frame 27 has a shape that links one end of the right light guide plate 26 and one end of the left light guide plate 28 to each other. The linkage position corresponds to a position between the eyes of the user on whom the image display section 20 is mounted. A nose pad that comes into contact with the nose of the user on whom the image display section 20 is mounted may be provided as part of the front frame 27 and in the position where the right light guide plate 26 and the left light guide plate 28 are linked to each other. In this case, the nose pad, the right holder 21, and the left holder 23 can hold the image display section 20 on the user's head. Further, a belt that comes into contact with the back of the head of the user on whom the image display section 20 is mounted may be linked to the right holder 21 and the left holder 23. In this case, the belt can securely hold the image display section 20 on the user's head.

The right display unit 22 displays an image via the right light guide plate 26. The right display unit 22 is provided on the right holder 21 and located in the vicinity of the right temporal region of the user on whom the image display section 20 is mounted. The left display unit 24 displays an image via the left light guide plate 28. The left display unit 24 is provided on the left holder 23 and located in the vicinity of the left temporal region of the user on whom the image display section 20 is mounted. The right display unit 22 and the left display unit 24 are also collectively called "display drivers."

The right light guide plate 26 and the left light guide plate 28 in the present embodiment are each an optical section (prism, for example) made, for example, of a light transmissive resin and guide image light outputted from the right display unit 22 and the left display unit 24 to the user's eyes. A light control plate may be provided on a surface of each of the right light guide plate 26 and the left light guide plate 28. The light control plate is a thin-plate-shaped optical element having transmittance that varies in accordance with the range of the wavelength of light passing therethrough and therefore functions as what is called a wavelength filter. The light control plates are so disposed as to cover, for example, part of the front surface of the front frame 27 (surface opposite the surface facing the user's eyes). Appropriate selection of optical characteristics of the light control plates allows adjustment of the transmittance of light in an arbitrary wavelength range, such as visible light, infrared light, and ultraviolet light and therefore allows adjustment of the amount of outside light externally incident on the right light guide plate 26 and the left light guide plate 28 and passing through the right light guide plate 26 and the left light guide plate 28.

The image display section 20 guides the image light produced by the right display unit 22 and the left display unit 24 to the right light guide plate 26 and the left light guide plate 28 and allows the user to visually recognize images (augmented reality (AR) images) produced by the image light (this action is also called "displaying images"). In a case where outside light passes through the right light guide plate 26 and the left light guide plate 28 from the side in front of the user and enters the user's eyes, the image light that forms images and the outside light enter the user's eyes. The intensity of the outside light therefore affects the visibility of images viewed by the user.

Therefore, for example, attaching the light control plates to the front frame 27 and selecting or adjusting the optical characteristics of the light control plates as appropriate allow adjustment of the visibility of the images. In a typical example, light control plates having light transmittance high enough to at least allow the user on whom the HMD 100 is mounted to visually recognize an outside scene can be selected. When the light control plates are used, it can be expected to achieve an effect of protecting the right light guide plate 26 and the left light guide plate 28 and suppressing damage of the right light guide plate 26 and the left light guide plate 28, adhesion of dirt thereto, and other undesirable effects thereon. The light control plates may be attachable to and detachable from the front frame 27 or the right light guide plate 26 and the left light guide plate 28. A plurality of types of light control plates may be changed from one to another in an attachable/detachable manner, or the light control plates may be omitted.

A camera 61 is disposed in the front frame 27 of the image display section 20. The camera 61 is provided in the front surface of the front frame 27 and in a position where the camera 61 does not block the outside light passing through the right light guide plate 26 and the left light guide plate 28. In the example shown in FIG. 1, the camera 61 is disposed on the side facing the end ER of the front frame 27. The camera 61 may instead be disposed on the side facing the end EL of the front frame 27 or in the portion where the right light guide plate 26 and the left light guide plate 28 are linked to each other.

The camera 61 is a digital camera including an imaging element, such as a CCD or a CMOS element, an imaging lens, and other components. The camera 61 in the present embodiment is a monocular camera but may instead be a stereocamera. The camera 61 captures an image of at least part of the outside (real space) in the direction extending from the front side of the HMD 100, in other words, in the direction toward the visual field in which the user on whom the HMD 100 is mounted performs visual recognition. In other words, the camera 61 performs imaging over the range or in the direction that overlaps with the user's visual field and performs imaging in the direction in which the user performs visual recognition. The angle of view of the camera 61 can be set as appropriate. In the present embodiment, the angle of view of the camera 61 is so set as to coincide with the entire visual field over which the user can perform visual recognition through the right light guide plate 26 and the left light guide plate 28. The camera 61 performs imaging under the control of a control functional section 150 (FIG. 6) and outputs captured image data to the control functional section 150.

The HMD 100 may include a distance measuring sensor that detects the distance to a measurement target object positioned in a measurement direction set in advance. The distance measuring sensor can, for example, be disposed in the front frame 27 and in a portion where the right light guide plate 26 and the left light guide plate 28 are linked to each other. The measurement direction of the distance measuring sensor can be a direction extending from the front side of the HMD 100 (direction that overlaps with the imaging direction of the camera 61). The distance measuring sensor can be formed, for example, of a light emitter, such as an LED and a laser diode, and a light receiver that receives light emitted from the light source and reflected off the measurement target object. In this case, the distance is determined by triangulation or a distance measurement process based on time difference. The distance measuring sensor may instead be formed, for example, of a transmitter that emits an ultrasonic wave and a receiver that receives the ultrasonic wave reflected off the measurement target object. In this case, the distance is determined by a distance measurement process based on time difference. The distance measuring sensor is controlled by the control functional section 150 (FIG. 6) and outputs a result of the detection to the control functional section 150, as in the case of the camera 61.

Figure 2:
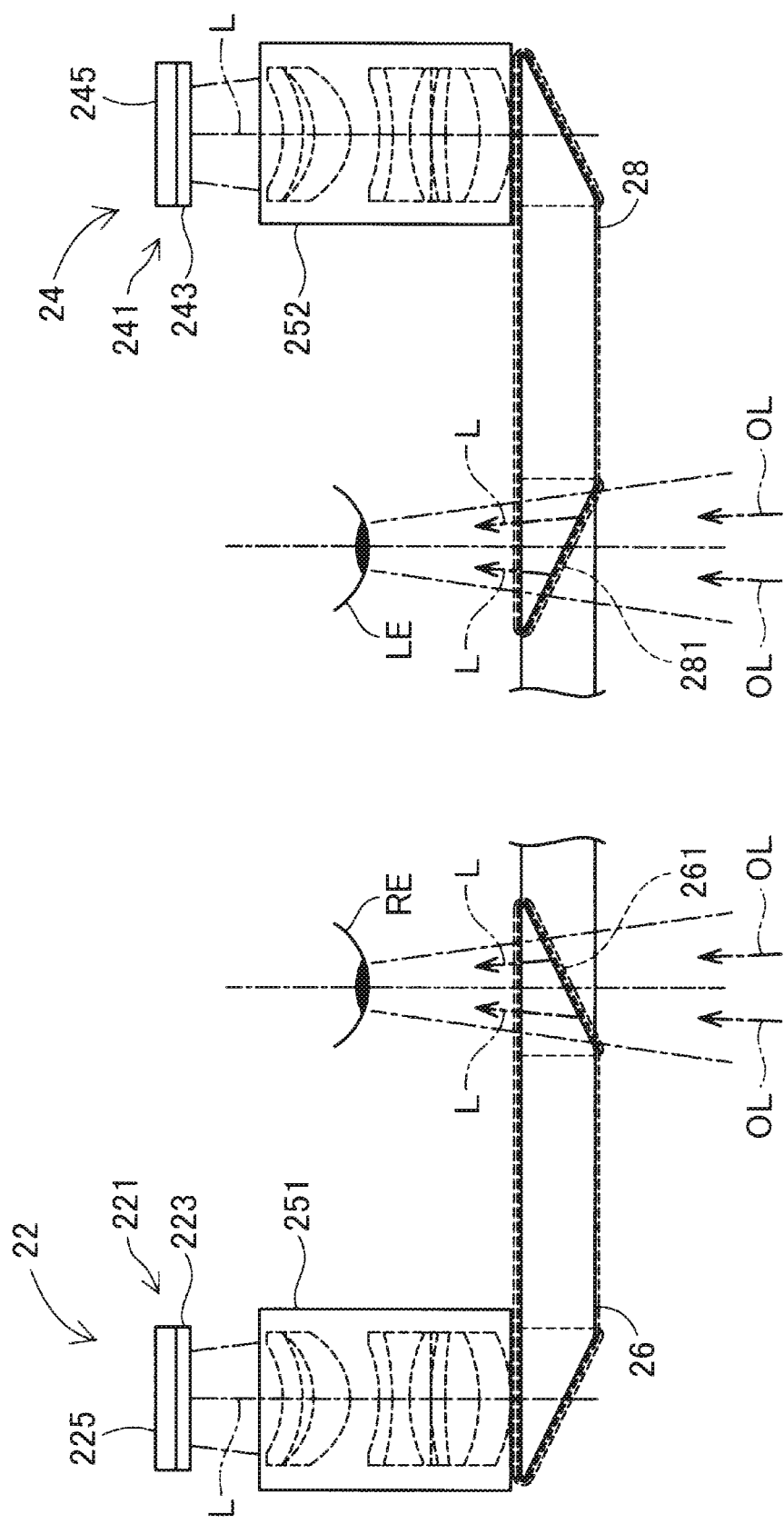
FIG. 2 is a key part plan view showing the configuration of an optical system provided in an image display section.

FIG. 2 is a key part plan view showing the configuration of an optical system provided in the image display section 20. FIG. 2 shows the user's right eye RE and left eye LE for ease of description. The right display unit 22 and the left display unit 24 are configured to be bilaterally symmetric, as shown in FIG. 2.

As the configuration that allows the right eye RE to visually recognize an image (AR image), the right display unit 22 includes an OLED (organic light emitting diode) unit 221 and a right optical system 251. The OLED unit 221 emits image light. The right optical system 251 includes lens groups and other components and guides the image light L emitted from the OLED unit 221 to the right light guide plate 26.

The OLED unit 221 includes an OLED panel 223 and an OLED drive circuit 225, which drives the OLED panel 223. The OLED panel 223 is a self-luminous display panel formed of light emitting elements that emit R (red), G (green), and B (blue) color light fluxes based on organic electroluminescence. The OLED panel 223 has a plurality of pixels arranged in a matrix, and each of the pixels is one pixel unit formed of one R element, one G element, and one B element.

Figure 5:
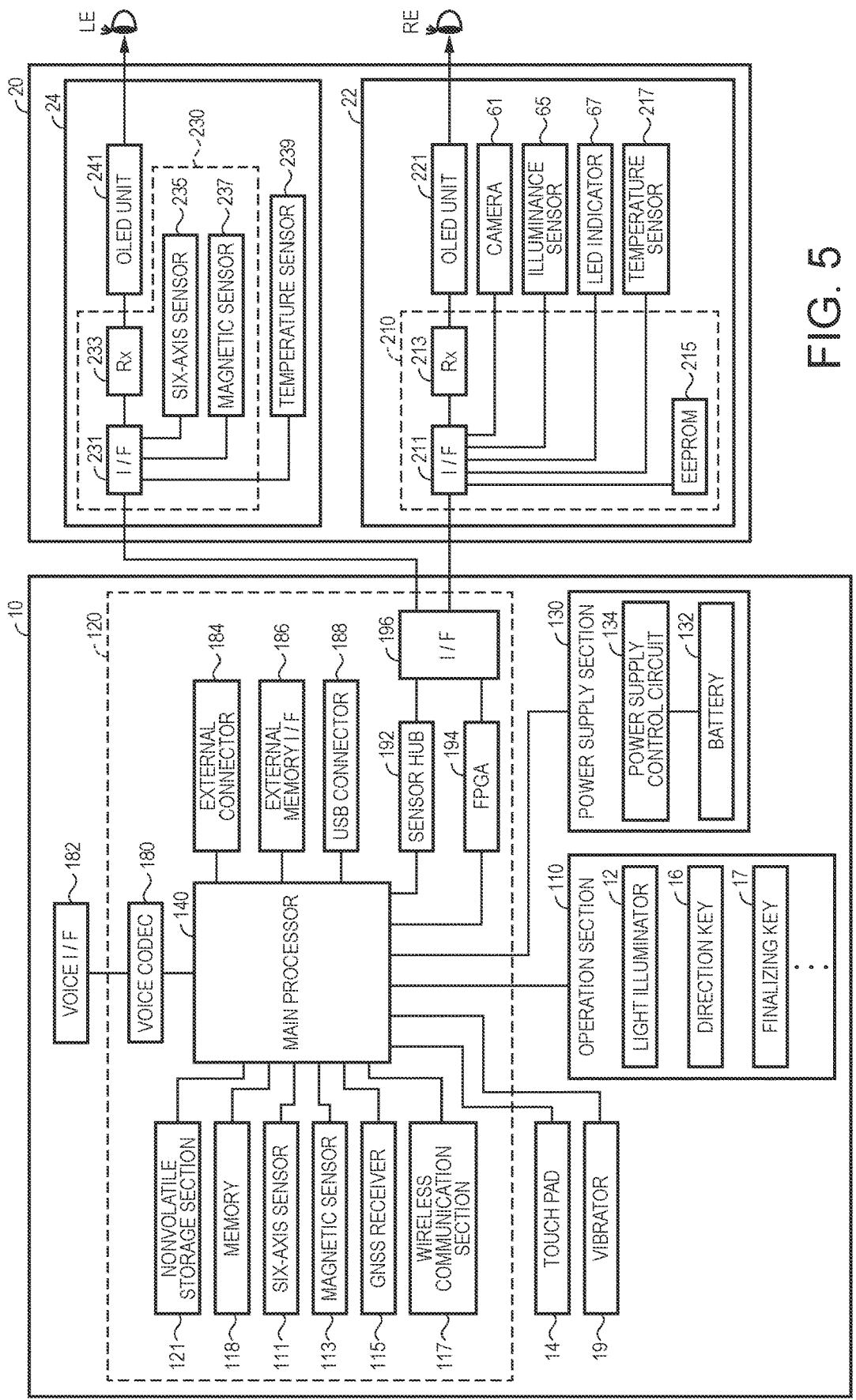
FIG. 5 is a functional block diagram showing the configuration of the HMD.
Figure 6:
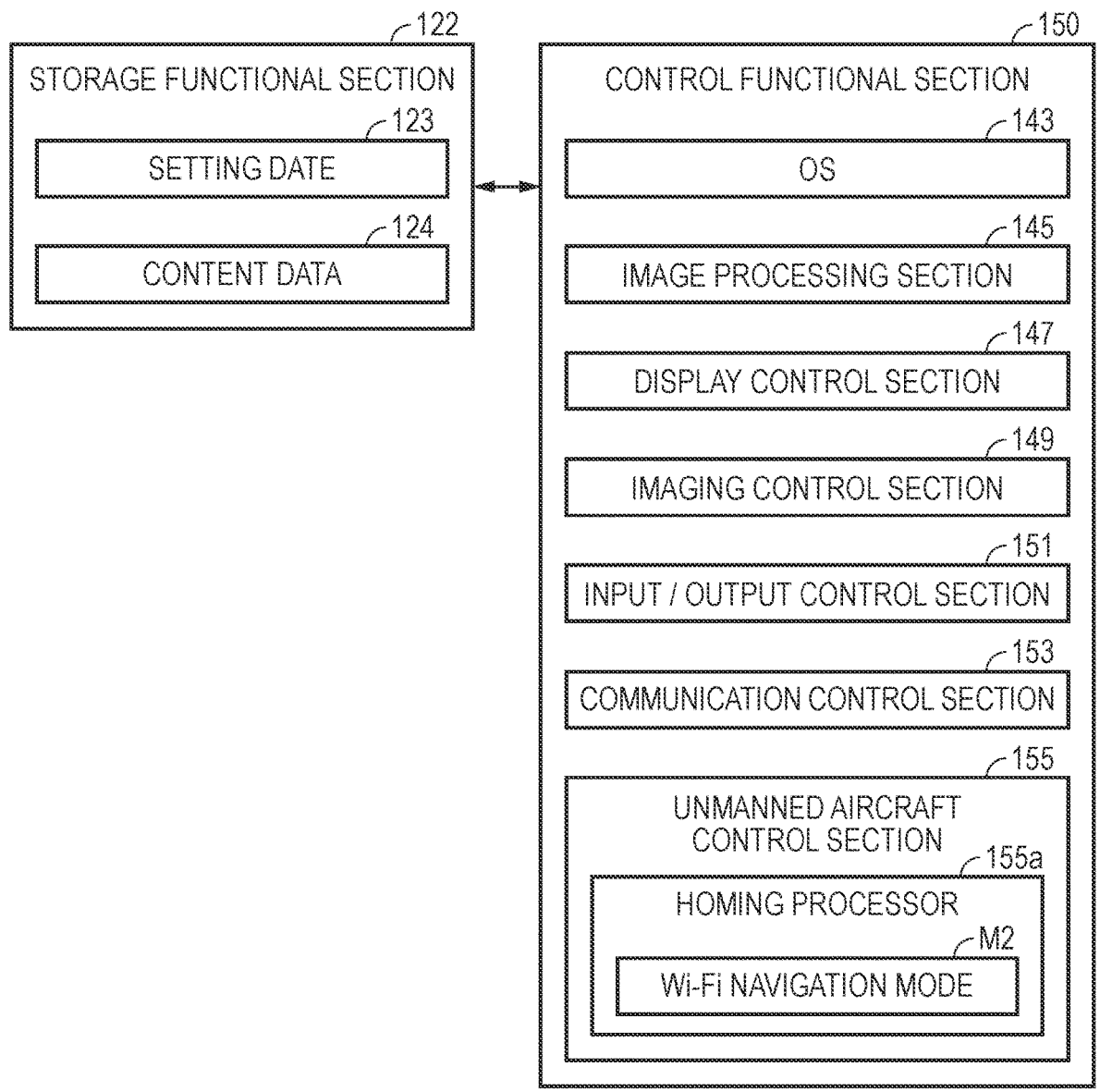
FIG. 6 is a functional block diagram showing the configuration of a control apparatus.

The OLED drive circuit 225 selects a light emitting element provided in the OLED panel 223 and supplies the light emitting element with electric power to cause the light emitting element to emit light under the control of the control functional section 150 (FIG. 6). The OLED drive circuit 225 is fixed, for example, in a bonding process to the rear surface of the OLED panel 223, that is, the rear side of the light emitting surface. The OLED drive circuit 225 may be formed, for example, of a semiconductor device that drives the OLED panel 223 and mounted on a substrate fixed to the rear surface of the OLED panel 223. A temperature sensor 217 (FIG. 5), which will be described later, is mounted on the substrate. The OLED panel 223 may instead have a configuration in which light emitting elements that emit white light are arranged in a matrix and color filters corresponding to the R, G, and B three colors are so disposed as to be superimposed on the light emitting elements. Still instead, an OLED panel 223 having a WRGB configuration including light emitting elements that radiate W (white) light in addition to the light emitting elements that radiate the R, G, and B color light fluxes may be employed.

The right optical system 251 includes a collimation lens that converts the image light L outputted from the OLED panel 223 into a parallelized light flux. The image light L having been converted by the collimation lens into a parallelized light flux is incident on the right light guide plate 26. A plurality of reflection surfaces that reflect the image light L are formed along the optical path along which the light is guided in the right light guide plate 26. The image light L undergoes reflection multiple times in the right light guide plate 26 and is then guided toward the right eye RE. A half-silvered mirror 261 (reflection surface) located in front of the right eye RE is formed on the right light guide plate 26. The image light L is reflected off the half-silvered mirror 261, then exits out of the right light guide plate 26 toward the right eye RE, and forms an image on the retina of the right eye RE, whereby an image is visually recognized by the user.

As the configuration that allows the left eye LE to visually recognize an image (AR image), the left display unit 24 includes an OLED unit 241 and a left optical system 252. The OLED unit 241 emits image light. The left optical system 252 includes lens groups and other components and guides the image light L emitted from the OLED unit 241 to the left light guide plate 28. The OLED unit 241 includes an OLED panel 243 and an OLED drive circuit 245, which drives the OLED panel 243. Details of the portions described above are the same as those of the OLED unit 221, the OLED panel 223, and the OLED drive circuit 225. A temperature sensor 239 (FIG. 5) is mounted on a substrate fixed to the rear surface of the OLED panel 243. Details of the left optical system 252 are the same as those of the right optical system 251.

The HMD 100 having the configuration described above can function as a see-through-type display. That is, on the user's right eye RE are incident the image light L reflected off the half-silvered mirror 261 and outside light OL having passed through the right light guide plate 26. On the user's left eye LE are incident the image light L reflected off the half-silvered mirror 281 and outside light OL having passed through the left light guide plate 28. The HMD 100 thus causes the image light L carrying internally processed images and the outside light OL to be superimposed on each other and causes the superimposed light to enter the user's eyes. As a result, the user views the outside (real world) through the right light guide plate 26 and the left light guide plate 28 and visually recognizes images (AR images) formed by the image light L and superimposed on the outside.

The half-silvered mirror 261 and the half-silvered mirror 281 function as "image extracting sections" that reflect the image light outputted from the right display unit 22 and the left display unit 24 and extract images from the image light. The right optical system 251 and the right light guide plate 26 are also collectively called a "right light guide unit," and the left optical system 252 and the left light guide plate 28 are also collectively called a "left light guide unit." The configuration of the right and left light guide units is not limited to the example described above and can be arbitrarily configured as long as the image light is used to form images in positions in front of the user's eyes. A diffraction grating or a half-transmissive/reflective film may, for example, be used as each of the right and left light guide units.

In FIG. 1, the control apparatus 10 and the image display section 20 are connected to each other via a connection cable 40. The connection cable 40, which is detachably connected to a connector provided on the lower side of the control apparatus 10, is inserted through an end AL of the left holder 23 and connected to a variety of circuits in the image display section 20. The connection cable 40 includes a metal cable or an optical fiber cable through which digital data is transmitted. The connection cable 40 may further include a metal cable through which analog data is transmitted. A connector 46 is provided in a halfway position along the connection cable 40.

The connector 46 is a jack to which a stereo mini plug is connected, and the connector 46 is connected to the control apparatus 10, for example, via a line through which an analog voice signal is transmitted. In the example of the present embodiment shown in FIG. 1, a headset 30 including a right earphone 32 and a left earphone 34, which form a stereo headphone, and a microphone 63 is connected to the connector 46.

The microphone 63 is so disposed that a sound collector of the microphone 63 faces in the direction of the user's sightline as shown, for example, in FIG. 1. The microphone 63 collects voice and outputs a voice signal to a voice interface 182 (FIG. 5). The microphone 63 may be a monaural microphone, a stereo microphone, a directional microphone, or an omni-directional microphone.

The control apparatus 10 is an apparatus for controlling the HMD 100 (image display section 20, in particular). The control apparatus 10 includes a light illuminator 12, a touch pad 14, a direction key 16, a finalizing key 17, and a power switch 18. The light illuminator 12 notifies the action state of the HMD 100 (whether HMD 100 is powered on or off, for example) in the form of the light emission aspect of the light illuminator 12. The light illuminator 12 can, for example, be an LED (light emitting diode).

The touch pad 14 detects contact operation performed on the operation surface of the touch pad 14 and outputs a signal according to the content of the detection. The touch pad 14 can be any of a variety of touch pads that operate based on an electrostatic method, a pressure detection method, or an optical method. The direction key 16 detects operation of pressing a key corresponding to any of the upward, downward, rightward, and leftward directions and outputs a signal according to the content of the detection. The finalizing key 17 detects pressing operation performed thereon and outputs a signal for finalizing the content operated on the control apparatus 10. The power switch 18 detects operation of causing the switch to slide to switch the power-on/off state of the HMD 100 from one to the other.

Figure 3:
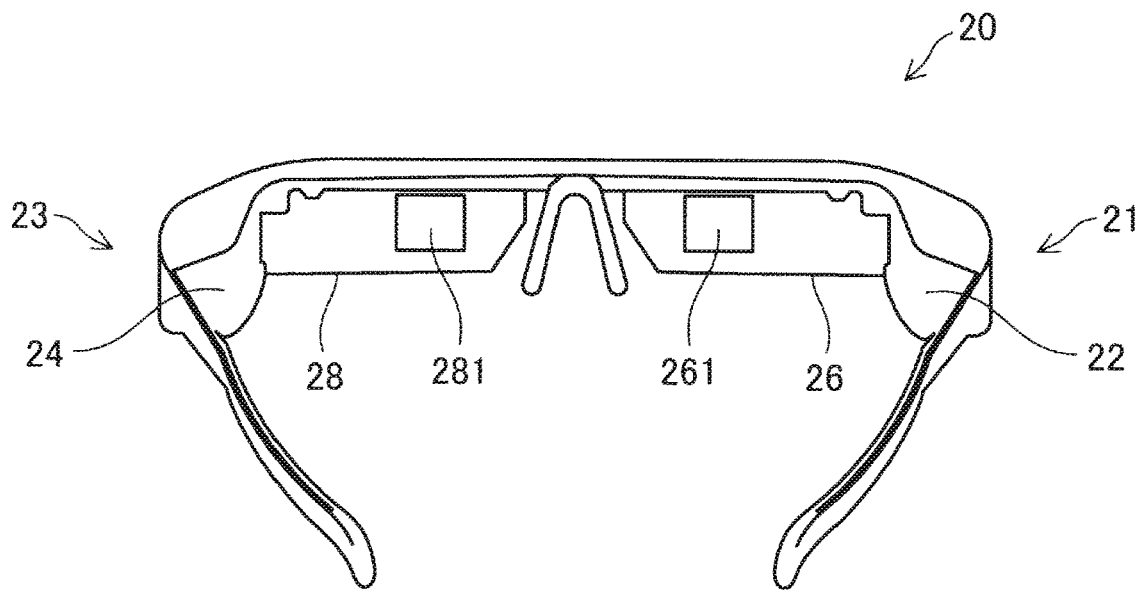
FIG. 3 shows the configuration of key parts of the image display section viewed from a user.

FIG. 3 shows the configuration of key parts of the image display section 20 viewed from the user. In FIG. 3, the connection cable 40, the right earphone 32, and the left earphone 34 are omitted. In the state shown in FIG. 3, the rear side of the right light guide plate 26 and the left light guide plate 28 can be visually recognized, and the half-silvered mirror 261 for irradiating the right eye RE with image light and the half-silvered mirror 281 for irradiating the left eye LE with image light can be visually recognized as roughly quadrangular areas. The user therefore visually recognizes the outside through the entire right light guide plate 26 and left light guide plate 28 including the half-silvered mirrors 261 and 281 and further visually recognizes rectangular displayed images in the positions of the half-silvered mirrors 261 and 281.

Figure 4:
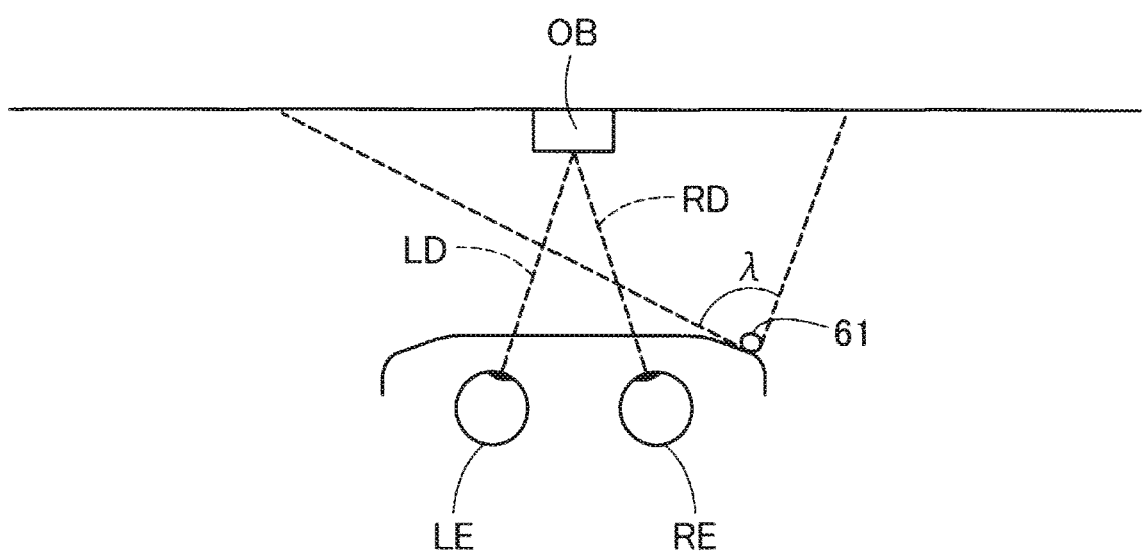
FIG. 4 describes the angle of view of a camera.

FIG. 4 describes the angle of view of the camera 61. FIG. 4 diagrammatically shows the camera 61 and the user's right eye RE and left eye LE in a plan view and further shows the angle of view (imaging range) of the camera 61 by λ. It is noted that the actual angle of view λ of the camera 61 has a horizontal range, as shown in FIG. 4, and also has a vertical range, as a typical digital camera does.

The camera 61 is disposed in a right end portion of the image display section 20 and performs imaging in the direction of the user's sightline (that is, captures an image of a space in front of the user), as described above. The direction of the optical axis of the camera 61 therefore falls within the range containing the directions of the sightlines from the right eye RE and the left eye LE. The outside visually recognizable by the user on whom the HMD 100 is mounted is not limited to the infinity. For example, when the user gazes at a target object OB with the two eyes, the user's sightlines are directed toward the target object OB, as indicated by reference characters RD and LD in FIG. 4. In this case, the distance from the user to the target object OB ranges from about 30 cm to 10 m in many instances, and the distance is more likely to range from 1 to 4 m. In view of the fact described above, guideline values of the upper and lower limits of the distance from the user to the target object OB in typical conditions under which the HMD 100 is used may be set. The guideline values may be determined in advance and preset in the HMD 100 or may be set by the user. The optical axis and the angle of view of the camera 61 are preferably so set that the target object OB falls within the angle of view in a case where the distance to the target object OB under the typical use conditions is equal to the set guideline values of the upper and lower limits.

It is generally believed that a person's angular field of view is about 200 degrees in the horizontal direction and about 125 degrees in the vertical direction. Within these ranges, an effective field of view, where the person has excellent information reception capability, extends over a horizontal range of about 30 degrees and a vertical range of about 20 degrees. It is further believed that a stable field of fixation, where a point of fixation at which the person gazes is viewed in a quick, stable manner, extends over a horizontal range from about 60 to 90 degrees and a vertical range from about 45 to 70 degrees. In this case, when the point of fixation coincides with the target object OB (FIG. 4), the effective field of view extends over the horizontal range of about 30 degrees and the vertical range of about 20 degrees around the sightlines RD and LD. The stable field of fixation extends over the horizontal range from about 60 to 90 degrees and the vertical range from about 45 to 70 degrees around the lines of sight RD and LD. The actual field of view visually recognized by the user through the image display section 20 and further through the right light guide plate 26 and the left light guide plate 28 is called an actual field of view (FOV). The actual field of view is narrower than the angular field of view and the stable field of fixation but wider than the effective field of view.

The angle of view λ of the camera 61 in the present embodiment is so set as to allow imaging over a range that coincides with the user's field of view. The angle of view λ of the camera 61 may instead be so set as to allow imaging over a range at least wider than the user's effective field of view. The angle of view λ of the camera 61 may still instead be so set as to allow imaging over a range wider than the actual field of view. The angle of view λ of the camera 61 may still instead be so set as to allow imaging over a range wider than the user's stable field of fixation or may still instead be so set as to allow imaging over a range wider than the user's binocular angular field of view. To this end, the camera 61 may include what is called a wide-angle lens as the imaging lens for imaging over a wide angle of view. The wide-angle lens may include a lens called a super-wide-angle lens or a semi-wide-angle lens. The camera 61 may include a fixed-focal-length lens, a zoom lens, or a lens group formed of a plurality of lenses.

FIG. 5 is a block diagram showing the electrical configuration of the HMD 100. The control apparatus 10 includes a main processor 140, which executes a program to control the HMD 100, storage sections, input/output sections, a variety of sensors, an interface, and a power supply section 130. The storage sections, the input/output sections, the variety of sensors, the interface, and the power supply section 130 are connected to the main processor 140. The main processor 140 is mounted on a controller substrate 120 built in the control apparatus 10.

The storage sections include a memory 118 and a nonvolatile storage section 121. The memory 118 forms a work area that temporarily stores a computer program executed by the main processor 140 and data processed by the main processor 140. The nonvolatile storage section 121 is formed of a flash memory or an eMMC (embedded multimedia card). The nonvolatile storage section 121 stores a computer program executed by the main processor 140 and a variety of data processed by the main processor 140. In the present embodiment, these storage sections are mounted on the controller substrate 120.

The input/output sections include the touch pad 14 and an operation section 110. The operation section 110 includes the direction key 16, the finalizing key 17, and the power switch 18 provided in the control apparatus 10. The main processor 140 controls these input/output sections and acquires signals outputted from the input/output sections.

The variety of sensors include a six-axis sensor 111, a magnetic sensor 113, and a GNSS receiver 115. The six-axis sensor 111 is a motion sensor (inertial sensor) including a three-axis acceleration sensor and a three-axis gyro (angular velocity) sensor. The six-axis sensor 111 may be an IMU formed of the sensors described above as a modular part. The magnetic sensor 113 is, for example, a three-axis geomagnetic sensor.

The GNSS receiver 115 receives electric waves transmitted from navigation satellites by using a GNSS antenna that is not shown and analyzes the received electric waves by using a GNSS circuit that is not shown to acquire GNSS information. The GNSS information contains position information containing the latitude, longitude, and altitude and information on imaging time and date.

The variety of sensors (six-axis sensor 111, magnetic sensor 113, and GNSS receiver 115) output detection values to the main processor 140 in accordance with sampling frequencies specified in advance. The timing at which the sensors each output a detection value may instead accord with an instruction from the main processor 140.

The interface includes a wireless communication section 117, a voice codec 180, an external connector 184, an external memory interface 186, a USB (universal serial bus) connector 188, a sensor hub 192, an FPGA 194, and an interface 196. The components described above each function as an interface with an external apparatus. The wireless communication section 117 performs wireless communication between the HMD 100 and an external apparatus. The wireless communication section 117 includes an antenna, an RF circuit, a baseband circuit, a communication control circuit, and other components that are not shown or is formed as a device formed of the above components integrated with one another. The wireless communication section 117 performs wireless communication compliant, for example, with a wireless LAN standard including Bluetooth (registered trademark) and Wi-Fi (registered trademark).

The voice codec 180 is connected to the voice interface 182 and decodes/encodes a voice signal inputted and outputted via the voice interface 182. The voice interface 182 is an interface via which a voice signal is inputted and outputted. The voice codec 180 may include an A/D converter that converts an analog voice signal into digital voice data and a D/A converter that performs conversion in the opposite direction. The HMD 100 according to the present embodiment outputs voice through the right earphone 32 (FIG. 1) and the left earphone 34 and collects sound via the microphone 63. The voice codec 180 converts digital voice data outputted from the main processor 140 into an analog voice signal and outputs the analog voice signal via the voice interface 182. The voice codec 180 further converts an analog voice signal inputted to the voice interface 182 into digital voice data and outputs the digital voice data to the main processor 140.

The external connector 184 is a connector that connects an external apparatus (personal computer, smartphone, and game console, for example) that communicates with the main processor 140 to the main processor 140. The external apparatus connected to the external connector 184 can be a content supply source and can also be used to debug the computer programs executed by the main processor 140 and collect action logs of the HMD 100. The external connector 184 can be implemented in a variety of aspects. Examples of the external connector 184 can be a USB interface, a micro USB interface, a memory card interface, or any other interface that handles wired connection, or a wireless LAN interface, a Bluetooth interface, or any other interface that handles wireless connection.

The external memory interface 186 is an interface that allows connection to a portable memory device. The external memory interface 186 includes, for example, a memory card slot into which a card-shaped recording medium is inserted and via which data is read and written and an interface circuit. The size, shape, standard, and other factors of the card-shaped recording medium can be selected as appropriate. The USB connector 188 is an interface that allows connection to a memory device, a smartphone, a personal computer, and other devices compliant with a USB standard.

The USB connector 188 includes, for example, a connector compliant with the USB standard and an interface circuit. The size, shape, USB standard version, and other factors of the USB connector 188 can be selected as appropriate.

The sensor hub 192 and the FPGA 194 are connected to the image display section 20 via the interface (I/F) 196. The sensor hub 192 acquires detection values from the variety of sensors provided in the image display section 20 and outputs the detection values to the main processor 140. The FPGA 194 processes data transmitted from the main processor 140 and received by the portions of the image display section 20 and vice versa and transports the processed data via the interface 196. The interface 196 is connected to the right display unit 22 and the left display unit 24 of the image display section 20. In the example of the present embodiment, the connection cable 40 (FIG. 1) is connected to the left holder 23, and a wiring line that leads to the connection cable 40 is routed in the image display section 20, whereby the right display unit 22 and the left display unit 24 are connected to the interface 196 of the control apparatus 10.

The HMD 100 further includes a vibrator 19. The vibrator 19 includes a motor, an off-center rotator, and other components that are not shown and produces vibration under the control of the main processor 140. The HMD 100 causes the vibrator 19 to produce vibration in a predetermined vibration pattern, for example, when operation performed on the operation section 110 is detected or when the HMD 100 is powered on and off.

The power supply section 130 includes a battery 132 and a power supply control circuit 134. The power supply section 130 supplies electric power that allows the control apparatus 10 to operate. The battery 132 is a rechargeable cell. The power supply control circuit 134 detects the amount of remaining electric power in the battery 132 and controls electric charging to an OS 143. The power supply control circuit 134 is connected to the main processor 140 and outputs a detection value representing the amount of remaining electric power in the battery 132 and a detection value representing the voltage across the battery 132 to the main processor 140. Electric power may further be supplied from the control apparatus 10 to the image display section 20 based on the electric power supplied from the power supply section 130. The main processor 140 may be configured to be capable of controlling the state of electric power supply from the power supply section 130 to the portions of the control apparatus 10 and the image display section 20.

The right display unit 22 includes a display unit substrate 210, the OLED unit 221, the camera 61, an illuminance sensor 65, an LED indicator 67, and the temperature sensor 217. On the display unit substrate 210 are mounted an interface (I/F) 211 connected to the interface 196, a receiver (Rx) 213, and an EEPROM (electrically erasable programmable read-only memory) 215. The receiver 213 receives data inputted from the control apparatus 10 via the interface 211. The receiver 213, when it receives image data on an image to be displayed by the OLED unit 221, outputs the received image data to the OLED drive circuit 225 (FIG. 2).

The EEPROM 215 stores a variety of types of data in a form readable by the main processor 140. The EEPROM 215 stores, for example, data on light emission characteristics and display characteristics of the OLED units 221 and 241 of the image display section 20, data on sensor characteristics of the right display unit 22 or the left display unit 24, and other pieces of data. Specifically, for example, the EEPROM 215 stores a parameter relating to correction of the gamma values of the OLED units 221 and 241, data used to compensate detection values from the temperature sensors 217 and 239, which will be described later, and other pieces of data. The data described above are produced when the HMD 100 is inspected just before the HMD 100 is shipped from the factory and written onto the EEPROM 215. After the shipment, the main processor 140 reads the data in the EEPROM 215 and uses the data in a variety of processes.

The camera 61 performs the imaging in accordance with a signal inputted via the interface 211 and outputs captured image data or a signal representing the result of the imaging to the control apparatus 10. The illuminance sensor 65 is provided at the end ER of the front frame 27 and so disposed as to receive outside light from the space in front of the user on whom the image display section 20 is mounted, as shown in FIG. 1. The illuminance sensor 65 outputs a detection value corresponding to the amount of received light (intensity of received light). The LED indicator 67 is disposed at the end ER of the front frame 27 and in the vicinity of the camera 61, as shown in FIG. 1. The LED indicator 67 illuminates when the camera 61 is performing imaging to notify the user that the imaging is underway.

The temperature sensor 217 detects temperature and outputs a voltage value or a resistance value corresponding to the detected temperature. The temperature sensor 217 is mounted on the rear surface of the OLED panel 223 (FIG. 2). The temperature sensor 217 may be mounted, for example, on the substrate on which the OLED drive circuit 225 is mounted. In the configuration described above, the temperature sensor 217 primarily detects the temperature of the OLED panel 223. The temperature sensor 217 may instead be built in the OLED panel 223 or the OLED drive circuit 225. For example, in a case where the OLED panel 223 is implemented as an Si-OLED, along with the OLED drive circuit 225, in the form of an integrated circuit on a unified semiconductor chip, the temperature sensor 217 may be implemented in the semiconductor chip.

The left display unit 24 includes a display unit substrate 230, the OLED unit 241, and the temperature sensor 239. On the display unit substrate 230 are mounted an interface (I/F) 231 connected to the interface 196, a receiver (Rx) 233, a six-axis sensor 235, and a magnetic sensor 237. The receiver 233 receives data inputted from the control apparatus 10 via the interface 231. The receiver 233, when it receives image data on an image to be displayed by the OLED unit 241, outputs the received image data to the OLED drive circuit 245 (FIG. 2).

The six-axis sensor 235 is a motion sensor (inertial sensor) including a three-axis acceleration sensor and a three-axis gyro (angular velocity) sensor. The six-axis sensor 235 may be an IMU having the sensors described above as a modular part. The magnetic sensor 237 is, for example, a three-axis geomagnetic sensor. The six-axis sensor 235 and the magnetic sensor 237, which are provided in the image display unit 20, detect motion of the user's head when the image display unit 20 is mounted on the user's head. The orientation of the image display unit 20, that is, the user's visual field is identified based on the detected head motion.

The temperature sensor 239 detects temperature and outputs a voltage value or a resistance value corresponding to the detected temperature. The temperature sensor 239 is mounted on the rear surface of the OLED panel 243 (FIG. 2). The temperature sensor 239 may be mounted, for example, on the substrate on which the OLED drive circuit 245 is mounted. In the configuration described above, the temperature sensor 239 primarily detects the temperature of the OLED panel 243. The temperature sensor 239 may instead be built in the OLED panel 243 or the OLED drive circuit 245. Details of the temperature sensor 239 are the same as those of the temperature sensor 217.

The camera 61, the illuminance sensor 65, and the temperature sensor 217 of the right display unit 22, and the six-axis sensor 235, the magnetic sensor 237, and the temperature sensor 239 of the left display unit 24 are connected to the sensor hub 192 of the control apparatus 10. The sensor hub 192 sets and initializes, under the control of the main processor 140, the sampling cycle in accordance with which each of the sensors performs detection. The sensor hub 192, for example, conducts electricity to the sensors, transmits control data thereto, and acquires detection values therefrom in accordance with the sampling cycle in accordance with which the sensors perform detection. The sensor hub 192 outputs detection values from the sensors provided in the right display unit 22 and the left display unit 24 at a preset timing to the main processor 140. The sensor hub 192 may have a cache function of temporarily holding the detection values from the sensors. The sensor hub 192 may also have the function of converting the signal format and data format of the detection values from the sensors (function of converting different formats into a unified format, for example).

The FPGA 194 starts and stops conducting electricity to the LED indicator 67 under the control of the main processor 140 to turn on and off the LED indicator 67.

FIG. 6 is a functional block diagram showing the configuration of the control apparatus 10. The control apparatus 10 includes a storage functional section 122 and the control functional section 150 from the viewpoint of function. The storage functional section 122 is a logical storage section formed of the nonvolatile storage section 121 (FIG. 5). The storage functional section 122 does not necessarily have the configuration in which only the nonvolatile storage section 121 is used and may instead have a configuration in which the nonvolatile storage section 121 is combined with the EEPROM 215 and the memory 118. The control functional section 150 is achieved when the main processor 140 executes the computer programs, that is, when the hardware and the software cooperate with each other.

The storage functional section 122 stores a variety of data used in processes carried out by the control functional section 150. Specifically, the storage functional section 122 in the present embodiment stores setting data 123 and content data 124. The setting data 123 contains a variety of setting values associated with the action of the HMD 100. For example, the setting data 123 contains a parameter, a determinant, an arithmetic expression, an LUT (lookup table), and other factors used when the control functional section 150 controls the HMD 100.

The content data 124 contains data on contents containing images and videos to be displayed by the image display section 20 under the control of the control functional section 150 (such as image data, video data, and voice data). The content data 124 may contain data on bidirectional contents. A bidirectional content means a content that causes the operation section 110 to acquire the user's operation, causes the control functional section 150 to carry out a process according to the acquired operation, and causes the image display section 20 to display a content according to the process. In this case, the content data may contain image data on a menu screen for acquiring the user's operation, data that specifies a process corresponding to each item contained in the menu screen, and other pieces of data. The video data is motion image data representing motion images.

The control functional section 150 uses the data stored in the storage functional section 122 to carry out a variety of processes to perform the functions of an OS 143, an image processing section 145, a display control section 147, an imaging control section 149, an input/output control section 151, a communication control section 153, and an unmanned aircraft control section 155. In the present embodiment, each of the functional sections excluding the OS 143 is achieved by an application program run on the OS 143.

The image processing section 145 produces signals to be transmitted to the right display unit 22 and the left display unit 24 based on image data on images/videos to be displayed by the image display section 20. The signals produced by the image processing section 145 may be a vertical sync signal, a horizontal sync signal, a clock signal, an analog image signal, and other signals. The image processing section 145 is not necessarily achieved by the computer programs executed by the main processor 140 and may instead be achieved by hardware (DSP (digital signal processor), for example) separate from the main processor 140.

The image processing section 145 may carry out a resolution conversion process, an image adjustment process, a 2D/3D conversion process, and other processes as required. The resolution conversion process is the process of converting the resolution of the image data into resolution suitable for the right display unit 22 and the left display unit 24. The image adjustment process is the process of adjusting the luminance and chroma of image data, gamma correction, and other types of processing. The 2D/3D conversion process is the process of creating 2D image data from 3D image data or creating 3D image data from 2D image data. The image processing section 145, when it performs any of the processes described above, produces a signal for displaying images based on the processed image data and transmits the signal to the image display section 20 via the connection cable 40.

The display control section 147 produces control signals that control the right display unit 22 and the left display unit 24, and the control signals control the right display unit 22 and the left display unit 24 to cause them to each produce and output image light. Specifically, the display control section 147 controls the OLED drive circuits 225 and 245 to cause them to display images on the OLED panels 223 and 243. The display control section 147 controls the timing at which the OLED drive circuits 225 and 245 draw images on the OLED panels 223 and 243, controls the luminance of the OLED panels 223 and 243, and performs other types of control based on the signals outputted from the image processing section 145.

The imaging control section 149 controls the camera 61 to cause it to perform imaging for generation of captured image data and causes the storage functional section 122 to temporarily store the data. In a case where the camera 61 is configured as a camera unit including a circuit that produces captured image data, the imaging control section 149 acquires the captured image data from the camera 61 and temporarily stores the data in the storage functional section 122.

The input/output control section 151 controls the tach pad 14 (FIG. 1), the direction key 16, and the finalizing key 17 as appropriate to acquire an input instruction therefrom. The acquired instruction is outputted to the OS 143 or, in addition thereto, a computer program that runs on the OS 143. The OS 143 or the computer program that runs on the OS 143 moves a cursor displayed on the screen of the image display section 20 based on the input instruction. The communication control section 153 controls the wireless communication section 117 to perform wireless communication with an external apparatus.

The unmanned aircraft control section 155 allows the HMD 100 to maneuver the unmanned aircraft 400 by directly or indirectly transmitting and receiving to and from the unmanned aircraft 400. The unmanned aircraft control section 155 will be described later in detail.

Figure 7:
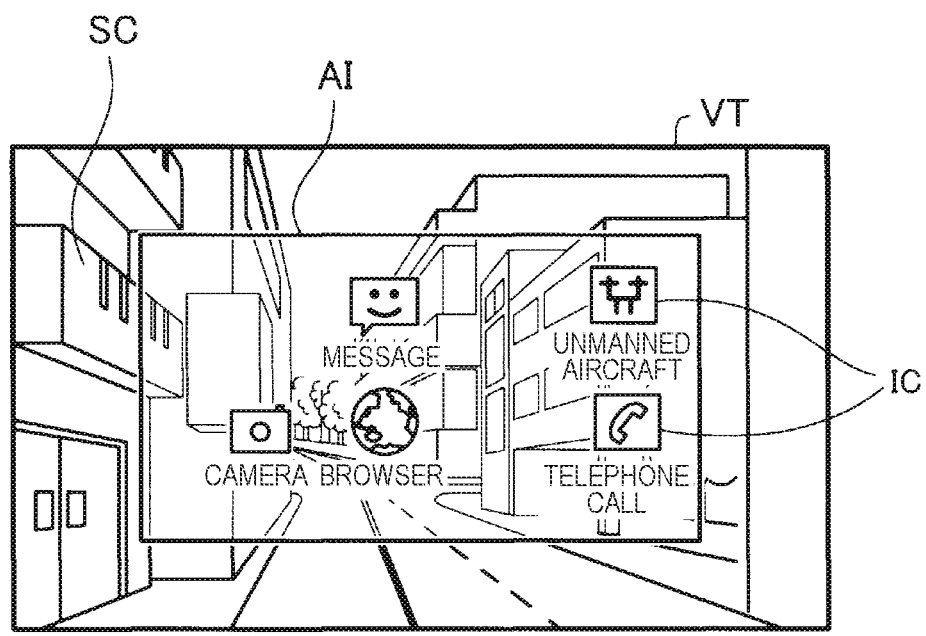
FIG. 7 is a descriptive view showing an example of augmented reality display performed by the HMD.

FIG. 7 is a descriptive view showing an example of augmented reality display performed by the HMD 100. FIG. 7 shows an example of the user's visual field VT. When the image light guided to the eyes of the user of the HMD 100 is focused on the user's retina as described above, the user visually recognizes augmented reality (AR) in the form of an image AI. In the example shown in FIG. 7, the image AI is a menu screen created by the OS of the HMD 100. The menu screen contains icons IC for activating respective application programs, for example, "message," "telephone call," "camera," "browser," and "unmanned aircraft." Further, light from the outside SC passing through the right light guide plate 26 and the left light guide plate 28 allows the user to visually recognize the outside SC. As described above, in the visual field VT, the user of the HMD 100 according to the present embodiment can view the portion where the image AI is displayed in such a way that the image AI is superimposed on the outside SC. On the other hand, in the visual field VT, the user can view only the outside SC in the portion where no image AI is displayed.

A-3. Configuration of Unmanned Aircraft and Remote Control Apparatus:

The unmanned aircraft 400 includes four propellers 410 (two of them are not shown) and a camera 420, as shown in FIG. 1. The unmanned aircraft 400 can freely and stably fly around in the air by using the four propellers 410 and can capture an image of the ground from the sky by using the camera 420.

Figure 8:
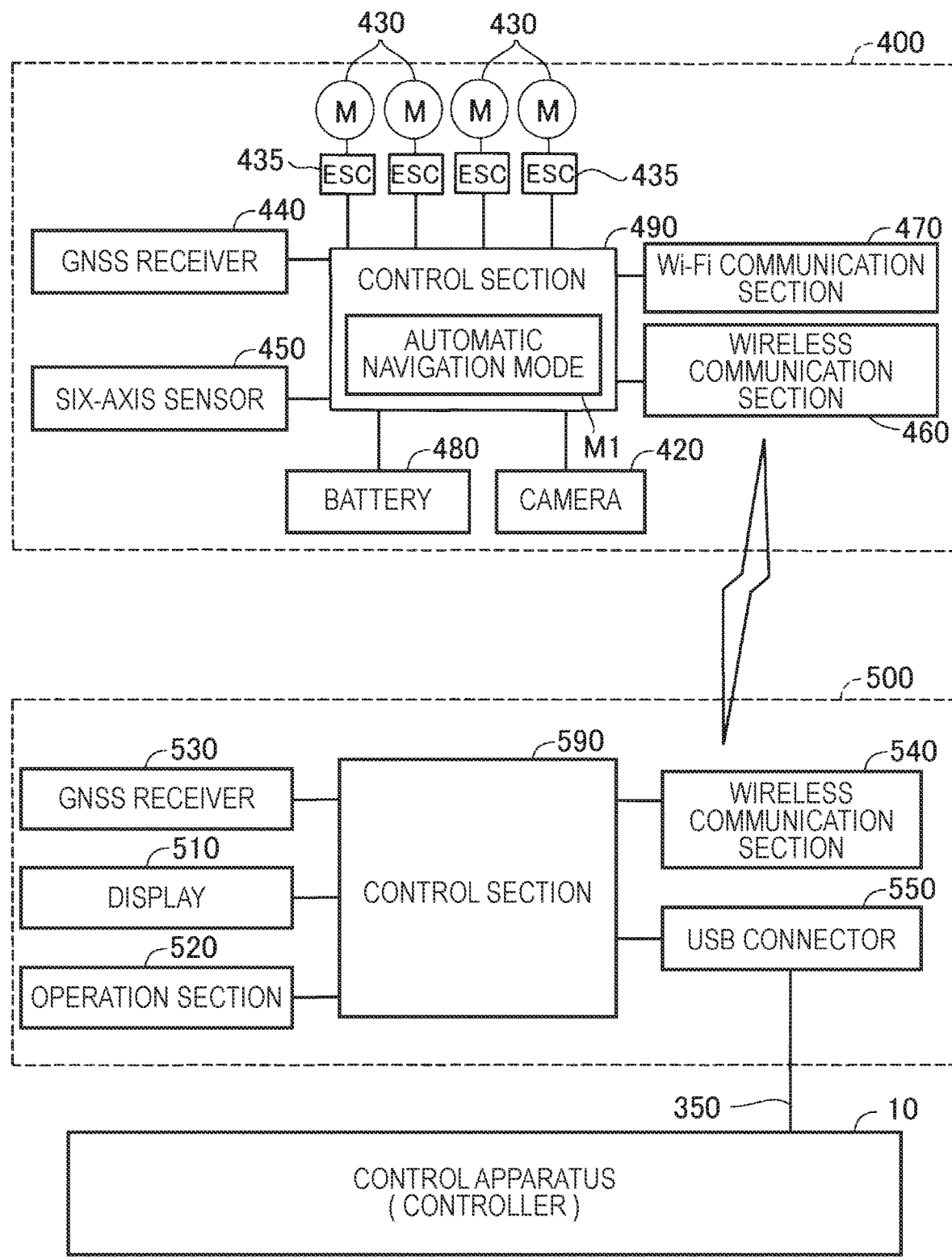
FIG. 8 is a block diagram showing the electrical configurations of an unmanned aircraft and a remote control apparatus.

FIG. 8 is a block diagram showing the electrical configuration of the unmanned aircraft 400 and the electrical configuration of the remote control apparatus 500. The unmanned aircraft 400 includes four motors 430, four ESCs (electronic speed controllers) 435, a GNSS receiver 440, a six-axis sensor 450, a wireless communication section 460, a Wi-Fi communication section 470, a battery 480, and a control section 490.

The motors 430 are connected to and drive the respective propellers 410. The ESCs are connected to the respective motors 430 and control the numbers of revolutions of the motors 430 in accordance with input signals.

The GNSS receiver 440 receives electric waves transmitted from navigation satellites by using a GNSS antenna that is not shown and analyzes the received electric waves by using a GNSS circuit that is not shown to acquire GNSS information. The GNSS information contains position information containing the latitude, longitude, and altitude and information on imaging time and date. The GNSS information allows the unmanned aircraft 400 to grasp the current position (latitude, longitude, and altitude) of the airframe (unmanned aircraft 400).

The six-axis sensor 450 is a motion sensor (inertial sensor) including a three-axis acceleration sensor and a three-axis gyro (angular velocity) sensor. The six-axis sensor 450 may be an IMU (inertial measurement unit) formed of the sensors described above as a modular part. The six-axis sensor 450 allows the unmanned aircraft 400 to grasp the attitude, the speed, and other factors of the airframe.

The wireless communication section 460 performs wireless communication with a wireless communication section 540 provided in the remote control apparatus 500. The Wi-Fi communication section 470 performs wireless communication compliant with a wireless LAN standard, such as Wi-Fi. In the present embodiment, in a Wi-Fi navigation mode, which will be described later, the Wi-Fi communication section 470 transmits and receives a Wi-Fi electric wave to and from the wireless communication section 117 provided in the control apparatus 10 of the HMD 100.

The battery 480 is a power supply that supplies the entire unmanned aircraft 400 with electric power and is a lithium polymer battery in the present embodiment.

The camera 420, the ESCs 435, the GNSS receiver 440, the six-axis sensor 450, the wireless communication section 460, the Wi-Fi communication section 470, and the battery 480 are connected to the control section 490. The control section 490 is formed of a microcomputer including a main processor and a storage section, reads a program into the storage section, and executes the program to perform a variety of functions. Specifically, the control section 490 performs wireless communication with the remote control apparatus 500 via the wireless communication section 460 and individually controls the numbers of revolutions of the motors 430 in accordance with a control instruction from the remote control apparatus 500. As a result, the control section 490 allows the airframe to ascend, descend, travel forward and rearward, move rightward and leftward, and hover in accordance with an instruction from the remote control apparatus 500. The control section 490 further allows the camera 420 to perform imaging in accordance with an instruction from the remote control apparatus 500 and causes a display 510 to display a captured image.

The control section 490 can further move the airframe in an automatic navigation mode M1. The automatic navigation mode M1 is a mode that allows the airframe to automatically travel to a destination based on set position information representing the destination. Since the unmanned aircraft 400 can grasp the current position of the airframe via the GNSS receiver 440, as described above, the control section 490 can automatically move the airframe to the destination in the automatic navigation mode M1 by keeping computing the direction and distance from the current position to the position of the destination and controlling the number of revolutions of each of the motors 430 in accordance with the computed direction and distance.

One of the functions using the automatic navigation mode M1 is the function of returning the unmanned aircraft 400 to the takeoff point, for example, in a case where the communication between the remote control apparatus 500 and the unmanned aircraft 400 is lost. The control section 490 can return the airframe to the takeoff point by setting the destination to be the position information on the takeoff point contained in the GNSS information and stored in advance.

The remote control apparatus 500 includes the display 510 and a joystick-type operation section 520, as shown in FIG. 1. The remote control apparatus 500 further includes a GNSS receiver 530, a wireless communication section 540, a USB connector 550, and a control section 590, as shown in FIG. 8.

The GNSS receiver 530 receives electric waves transmitted from GNSS satellites by using a GNSS antenna that is not shown and analyzes the received electric waves by using a GNSS circuit that is not shown to acquire GNSS information. The GNSS information contains position information containing the latitude, longitude, and altitude and information on imaging time and date. The GNSS information allows the remote control apparatus 500 to grasp the current position (latitude, longitude, and altitude) of the remote control apparatus 500.

The wireless communication section 540 performs wireless communication with the wireless communication section 460 provided in the unmanned aircraft 400. The USB connector 550 includes a connector compliant, for example, with the USB standard and an interface circuit. The USB connector 550 is an interface that allows connection to a memory device, a smartphone, a personal computer, and other devices compliant with the USB standard. In the present embodiment, the USB connector 550 is connected to the USB connector 188 provided in the control apparatus 10 of the HMD 100 via the USB cable 350. The USB connector 188 provided in the control apparatus corresponds to a "communication section capable of performing communication using wireless communication with the unmanned aircraft 400." The connection between the remote control apparatus 500 and the control apparatus 10 is not limited to USB connection and may instead be any other type of wired connection. Still instead, in place of the wired connection, the remote control apparatus 500 and the control apparatus 10 may be wirelessly connected with each other.

The display 510, the operation section 520, the GNSS receiver 530, the wireless communication section 540, and the USB connector 550 are connected to the control section 590. The control section 590 is formed of a microcomputer including a main processor and a storage section, reads a program into the storage section, and executes the program to perform a variety of functions. Specifically, the control section 590 transmits an operation instruction inputted from the operation section 520 to the unmanned aircraft 400 to instruct the unmanned aircraft 400 to fly in any of the following flight form: ascending; descending; forward travel; rearward travel; rightward movement; leftward movement; and hovering. The control section 590 further instructs the unmanned aircraft 400 to cause the camera 420 to perform imaging.

A-4. Homing Process Carried Out by HMD:

The control apparatus 10 provided in the HMD 100 includes the unmanned aircraft control section 155, which maneuvers the unmanned aircraft 400, as one of the functional sections of the control functional section 150, as described with reference to FIG. 6. The unmanned aircraft control section 155 causes the image display section 20 to display an operation screen (operation screen CB in FIG. 14, for example) that is a software-version operation section 520 of the remote control apparatus 500 and transmits an operation instruction inputted to the operation screen by the user of the HMD 100 to the remote control apparatus 500 to allow the HMD 100 to maneuver the unmanned aircraft 400 by using the functions of the remote control apparatus 500. The unmanned aircraft control section 155 may have all functions of the remote control apparatus 500 or only part of all functions of the remote control apparatus 500. The unmanned aircraft control section 155, when it receives an imaging instruction via the operation screen described above, transmits the imaging instruction to the remote control apparatus 500 to allow the HMD 100 to instruct the unmanned aircraft 400 to cause the camera 420 to perform imaging by using one of the functions of the remote control apparatus 500.

The operation screen that is the software-version operation section 520 is provided with a software button called "return to HMD." When the software button is operated by using the direction key 16 (FIG. 1) and the finalizing key 17 (FIG. 1), the unmanned aircraft control section 155 performs a homing process of homing the unmanned aircraft 400 to the HMD 100 (homing processor 155a).

Figure 9:
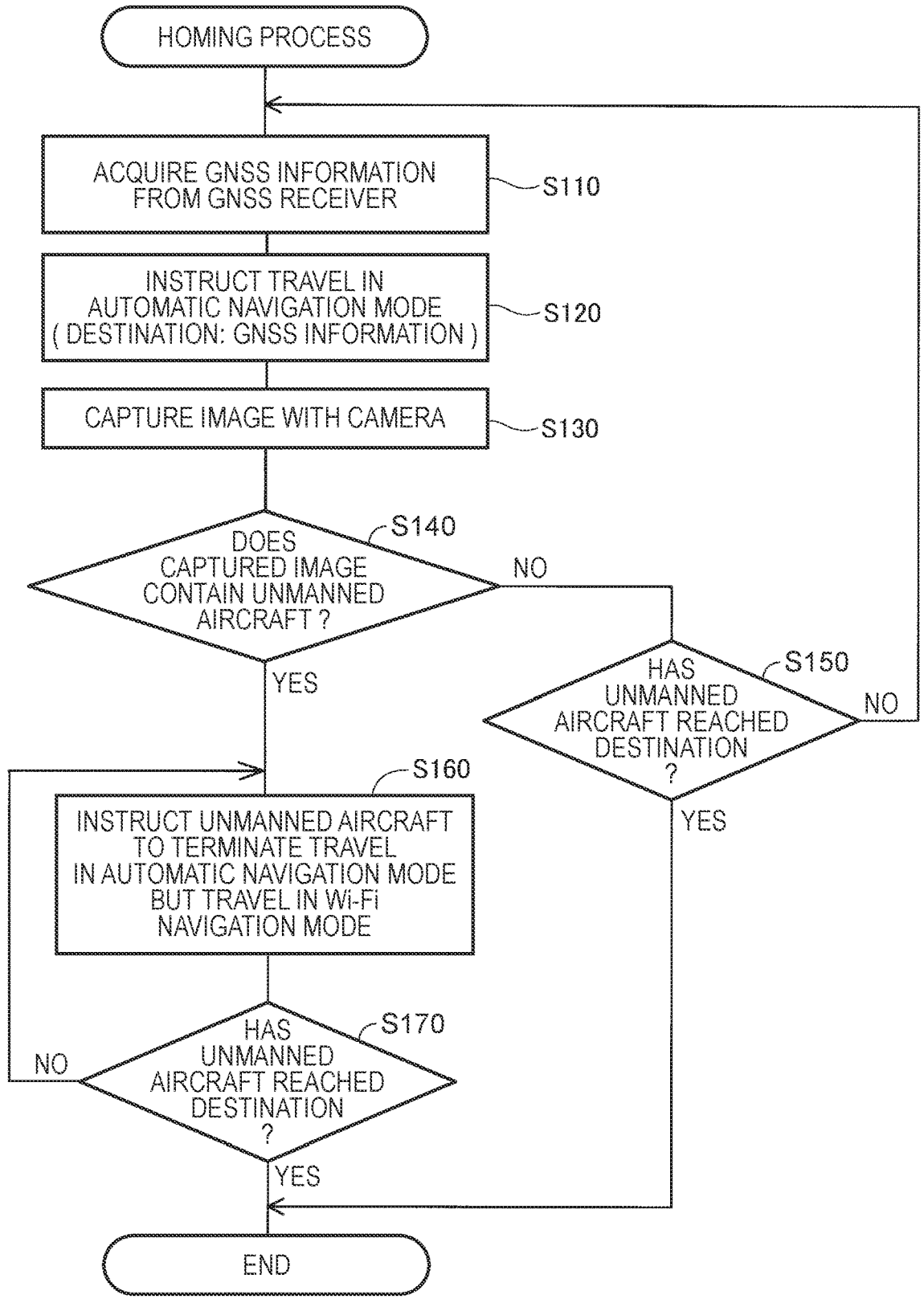
FIG. 9 is a flowchart showing a homing process.

FIG. 9 is a flowchart showing the homing process. The homing process is a process carried out by the homing processor 155a shown in FIG. 6 and specifically carried out by the main processor 140 of the HMD 100. When the icon IC of "unmanned aircraft" on the menu screen shown in FIG. 7 is pointed by using the direction key 16 (FIG. 1) and the finalizing key 17 (FIG. 1), and the "return to HMD" software button is operated in the activated application program "unmanned aircraft," the homing process starts.

When the process starts, the main processor 140 of the HMD 100 first acquires the GNSS information from the GNSS receiver 115 (S110). The main processor 140 and the process in S110 correspond to a "GNSS information acquisition section."

The main processor 140 then instructs the unmanned aircraft 400 to travel in the automatic navigation mode M1 (FIG. 8), in which the position information (latitude, longitude, and altitude) contained in the acquired GNSS information is set as the destination (S120). The instruction instructs the unmanned aircraft 400 via the remote control apparatus 500 to home to the current position of the control apparatus 10 of the HMD 100.

The main processor 140 then activates the camera 61 to cause it to capture an image of the outside in the user's sightline direction (S130). The captured outside corresponds to the visual field visually recognizable by the user through the image display section 20.

The main processor 140 subsequently evaluates whether or not the image captured with the camera 61 contains the unmanned aircraft 400 (S140). Specifically, an image showing a characteristic of the shape of the unmanned aircraft 400 is prepared as a target image, and pattern matching is performed on the captured image and the target image. In a case where the pattern matching detects that the captured image has a portion highly similar to the target object, the main processor 140 determines that the captured image contains the unmanned aircraft 400.

In place of the configuration in which an image showing the characteristic of the shape of the unmanned aircraft 400 is the target image, a marker may be attached to the unmanned aircraft 400 in advance, and the marker may be used as the target image. The marker is a two-dimensional marker and serves as an index for specifying a target image on which the pattern matching is performed.

Figure 10:
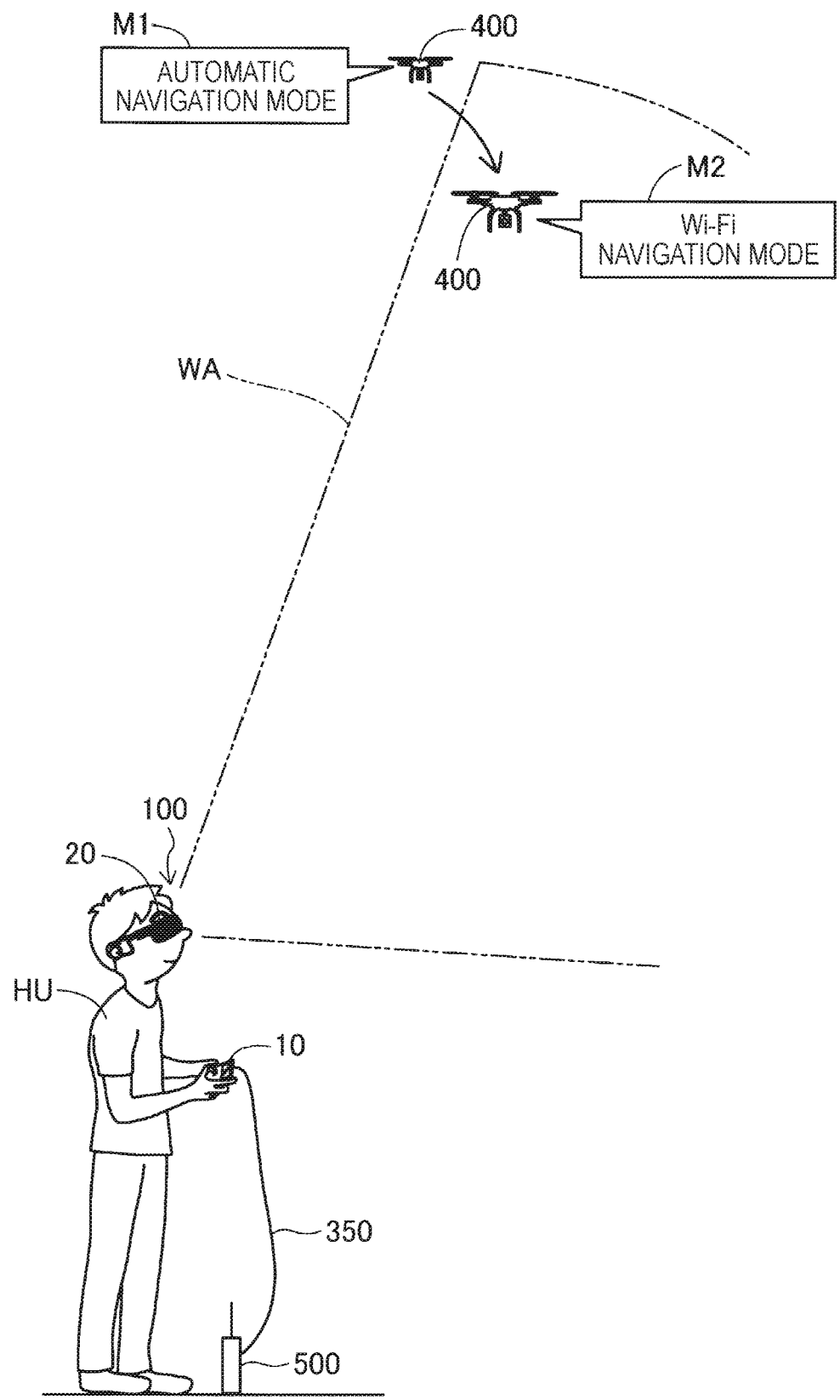
FIG. 10 describes a visual field visually recognizable by the user through the image display section.

FIG. 10 describes a visual field visually recognizable by the user through the image display section 20. In FIG. 10, the range indicated with the two-dot chain lines is, for example, a visual field WA visually recognizable through the image display section 20. The evaluation in S140 allows evaluation of whether or not the unmanned aircraft 400 has entered the visual field WA.

Referring back to FIG. 9, in a case where it is determined that the captured image does not contain the unmanned aircraft 400, that is, in a case where it is determined that the unmanned aircraft 400 has not entered the visual field WA, the main processor 140 evaluates whether or not the unmanned aircraft 400 has reached the destination set in S120 (S150). Whether or not the unmanned aircraft 400 has reached the destination has been grasped by the remote control apparatus 500 through the action of communicating with the unmanned aircraft 400, and the evaluation in S150 is made by interrogating the remote control apparatus 500.

In a case where it is determined in S150 that the unmanned aircraft 400 has not reached the destination, that is, in a case where the unmanned aircraft 400 has not entered the visual field WA or has not reached the destination, the main processor 140 returns to the process in S110, where the main processor 140 keeps carrying out the homing process in the automatic navigation mode M1. In a case where the unmanned aircraft 400 is flying in the space outside the visual field WA, the unmanned aircraft 400 travels in the automatic navigation mode M1, as shown in FIG. 10 by way of example.

The main processor 140 repeatedly carries out the process in S110 to S140, and in the case where it is determined that the captured image contains the unmanned aircraft 400, that is, in a case where the unmanned aircraft 400 has entered the visual field WA, the main processor 140 instructs the unmanned aircraft 400 to terminate the travel in the automatic navigation mode but travel in the Wi-Fi navigation mode (S160).

Figure 11:
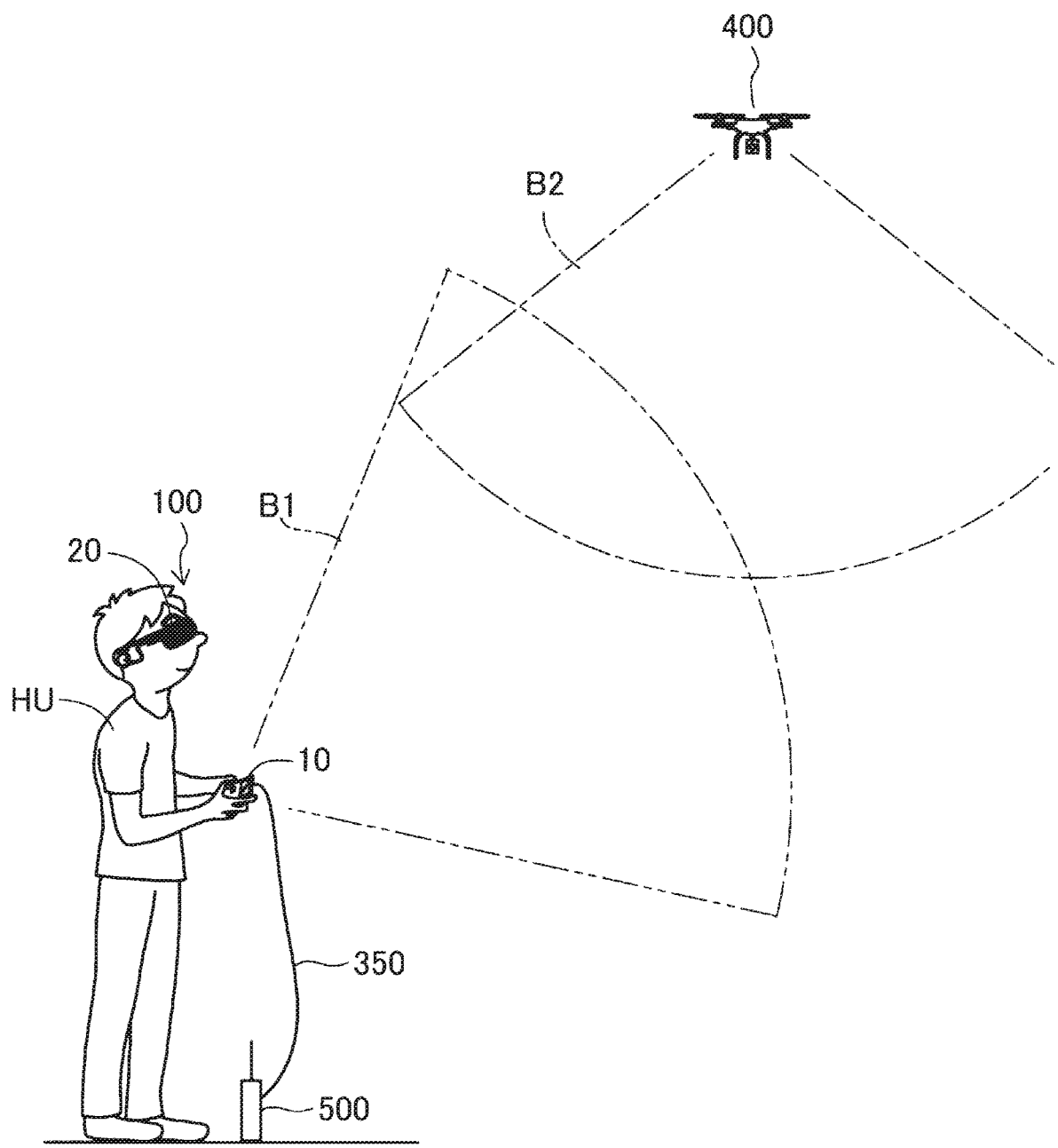
FIG. 11 describes a Wi-Fi navigation mode.

FIG. 11 describes the Wi-Fi navigation mode. In the Wi-Fi navigation mode M2 (see FIG. 6), transmission and reception of Wi-Fi electric waves B1 and B2 are performed between the control apparatus 10 of the HMD 100 and the unmanned aircraft 400, and the travel route of the unmanned aircraft 400 is determined from changes in the intensity of the Wi-Fi electric waves. Specifically, the navigation route is so determined as to coincide with the direction in which the intensities of the Wi-Fi electric waves increase. The main processor 140 measures the intensity of the Wi-Fi electric waves from the unmanned aircraft 400 in the Wi-Fi navigation mode M2, estimates the direction in which the intensity of the electric wave increases from a change in the intensity of the electric wave, sets the direction in which the intensity of the electric wave increases to be the travel route, and instructs the unmanned aircraft 400 via the remote control apparatus 500 to take a flight form in which the unmanned aircraft 400 flies along the set travel route. The flight form stands for the motion of the airframe, such as ascending, descending, forward and rearward travel, rightward and leftward movement, and hovering.

In place of the configuration in which the flight form is instructed to the unmanned aircraft 400 via the remote control apparatus 500, the control apparatus 10 may directly instruct the unmanned aircraft 400 about the flight form via the wireless communication section 117. Still instead, the process of estimating the direction in which the intensity of the electric wave increases and determining the direction in which the intensity of the electric wave increases as the travel route is not carried out by the control apparatus 10 but may be carried out by the control section 490 of the unmanned aircraft 400, and the control section 490 may control the flight form of the unmanned aircraft 400 in accordance with the determined travel route.

After the process in S160 in FIG. 9 is carried out, the main processor 140 evaluates whether or not the unmanned aircraft 400 has reached the position of the control apparatus 10 of the HMD 100 (S170) and keeps carrying out the homing process in the Wi-Fi navigation mode M2 until the unmanned aircraft 400 reaches the position. The unmanned aircraft 400, when it flies in the visual field WA, travels in the Wi-Fi navigation mode M2, as shown in FIG. 10 by way of example. Immediately before the unmanned aircraft 400 reaches the destination, however, the unmanned aircraft 400 recognizes an obstacle (the HMD 100 and the user in the description) via the camera 420 and automatically lands in a position separate from the obstacle by a preset distance so that the unmanned aircraft 400 does not collide with the HMD 100 or the user.

In a case where it is determined that the unmanned aircraft 400 has reached the destination in S170 or S150, the main processor 140 terminates the homing process.

A-5. Effects Provided by Embodiment:

According to the thus configured HMD 100 of the first embodiment, in the case where the unmanned aircraft 400 travels toward the control apparatus 10 in the automatic navigation mode M1 and enters the visual field WA visually recognizable through the image display section 20, the HMD 100 terminates the automatic navigation mode M1 and causes the unmanned aircraft 400 to travel in the Wi-Fi navigation mode M2, in which the travel route is specified from changes in the intensity of the Wi-Fi electric waves. Therefore, since the HMD 100 can terminate the travel in the automatic navigation mode M1 using low-accuracy GNSS information, the unmanned aircraft 400 is allowed to home to the HMD 100 with accuracy. In the present embodiment, in particular, the Wi-Fi navigation mode M2, to which the automatic navigation mode M1 is switched, is a mode in which the travel route is specified from changes in the intensity of the Wi-Fi electric waves, allowing high-accuracy navigation. The process of homing the unmanned aircraft 400 to the HMD 100 can therefore be carried out with accuracy.

As a variation of the first embodiment, the Wi-Fi navigation mode M2 may be replaced with a mode in which the travel route is specified from the intensity of an electric wave other than a Wi-Fi electric wave, for example, an electric wave used in any of a wireless LAN, Bluetooth, and an iBeacon (registered trademark).

B. Second Embodiment

Figure 12:
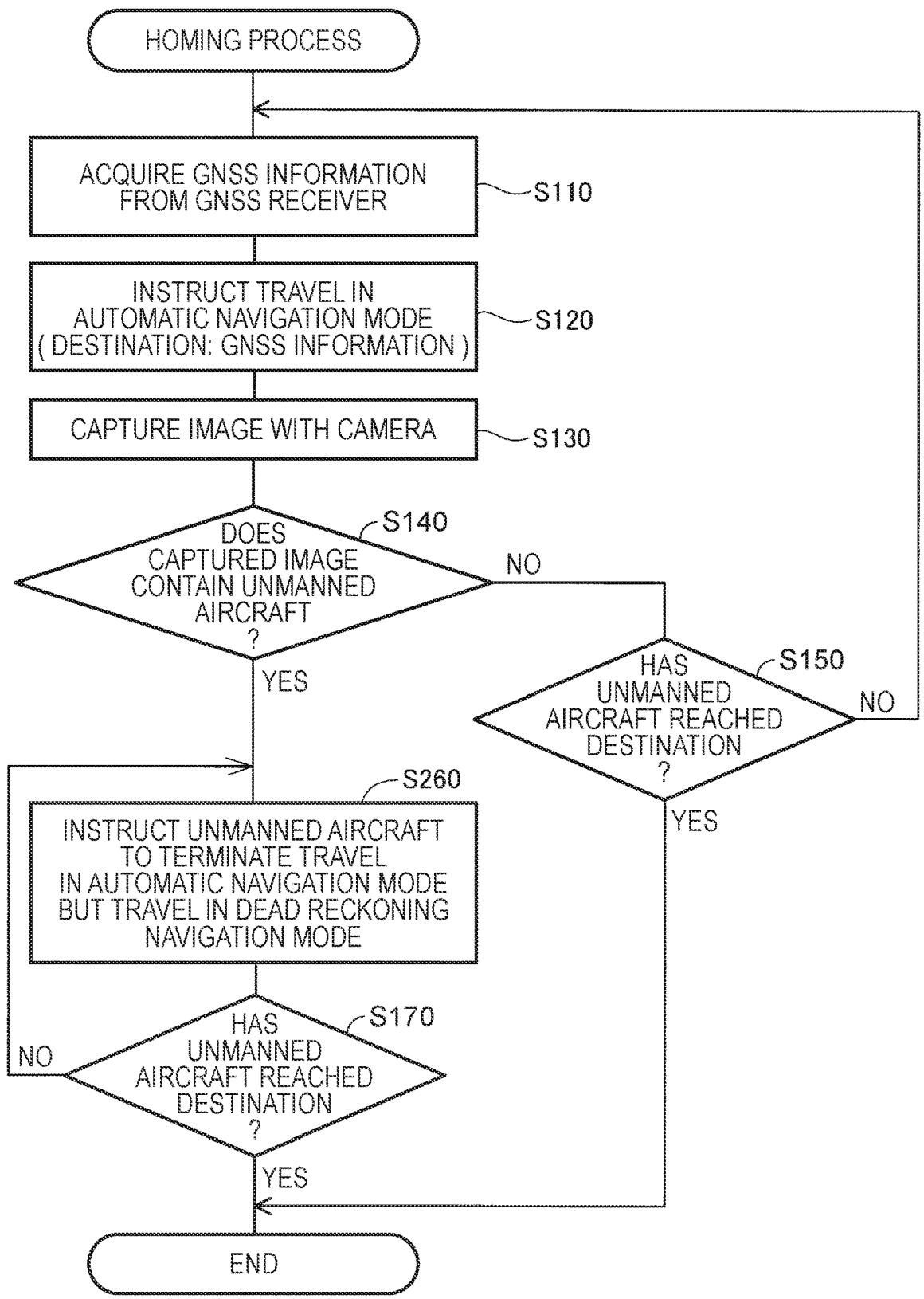
FIG. 12 is a flowchart showing the homing process carried out by an HMD according to a second embodiment.

FIG. 12 is a flowchart showing the homing process carried out by an HMD according to a second embodiment. The homing process carried out by the HMD according to the second embodiment differs from the homing process in the first embodiment (FIG. 9) in terms of the process in S260 corresponding to S160, and the processes in the other steps in the second embodiment are the same as those in the first embodiment. The hardware configuration of the HMD according to the second embodiment is the same as the hardware configuration of the HMD 100 according to the first embodiment. In the following description, the same parts as those in the first embodiment have the same reference characters in the first embodiment.

In step S260 in the homing process in FIG. 12, the main processor 140 instructs the unmanned aircraft 400 to terminate the travel in the automatic navigation mode but travel in a dead reckoning navigation mode. That is, in the case where the unmanned aircraft 400 enters the visual field WA visually recognizable through the image display section 20, in place of the homing process in the first embodiment, in which the automatic navigation mode M1 is switched to the Wi-Fi navigation mode M2, the automatic navigation mode M1 is switched to the dead reckoning navigation mode in the homing process in the second embodiment.

The unmanned aircraft 400 is provided with the six-axis sensor 450. The detection signal from the six-axis sensor 450 allows grasp of the attitude, speed, and other factors of the airframe of the unmanned aircraft 400. Therefore, setting an initial value to be the value of the detection signal from the six-axis sensor 450 (detected value) in the state in which the unmanned aircraft 400 is ready to take off and successively adding the detection value from the six-axis sensor 450 to the initial value (integration) allow determination of a relative position and attitude (position and attitude of unmanned aircraft 400) with respect to the position corresponding to the initial value. The method for thus determining the position and attitude of a target is called "dead reckoning."

On the other hand, the control apparatus of the HMD according to the second embodiment is also provided with the six-axis sensor 111 (FIG. 5), as in the first embodiment. Employing the dead reckoning approach therefore allows determination of the relative position and attitude (position and attitude of control apparatus of HMD) with respect to the position and attitude corresponding to the initial value. Before the homing process is carried out, the position and the attitude of the unmanned aircraft 400 that correspond to the initial value are calibrated into the position of the control apparatus of the HMD that corresponds to the initial value, and the dead reckoning is performed on both the unmanned aircraft 400 and the control apparatus of the HMD, whereby the current position and attitude of the unmanned aircraft 400 can be determined with respect to the current position and attitude of the control apparatus of the HMD.

In the dead reckoning navigation mode performed in S260, the main processor of the control apparatus determines the current position and attitude of the unmanned aircraft 400 with respect to the current position and attitude of the control apparatus of the HMD as described above, determines a travel route from the determined position and attitude, and instructs via the remote control apparatus 500 the unmanned aircraft 400 to take a flight form in which the unmanned aircraft 400 travels along the determined travel route. The flight form stands for stands for the motion of the airframe, such as ascending, descending, forward and rearward travel, rightward and leftward movement, and hovering.

In place of the configuration in which the flight form is instructed to the unmanned aircraft 400 via the remote control apparatus 500, the control apparatus may directly instruct the unmanned aircraft 400 about the flight form via the wireless communication section 117 (FIG. 5). Still instead, the process of determining the current position and attitude of the unmanned aircraft 400 with respect to the current position and attitude of the control apparatus of the HMD and determining the travel route from the determined position and attitude is not carried out by the control apparatus 10 but may be carried out by the control section 490 of the unmanned aircraft 400, and the control section 490 may control the flight form of the unmanned aircraft 400 in accordance with the determined travel route.

According to the dead reckoning navigation mode, the detection signals from the six-axis sensors 111 and 450 can be used to determine the current position and attitude of the unmanned aircraft 400 with respect to the current position and attitude of the control apparatus of the HMD with accuracy. The HMD according to the second embodiment can therefore home the unmanned aircraft 400 to the HMD with accuracy, as the HMD 100 according to the first embodiment.

C. Third Embodiment

Figure 13:
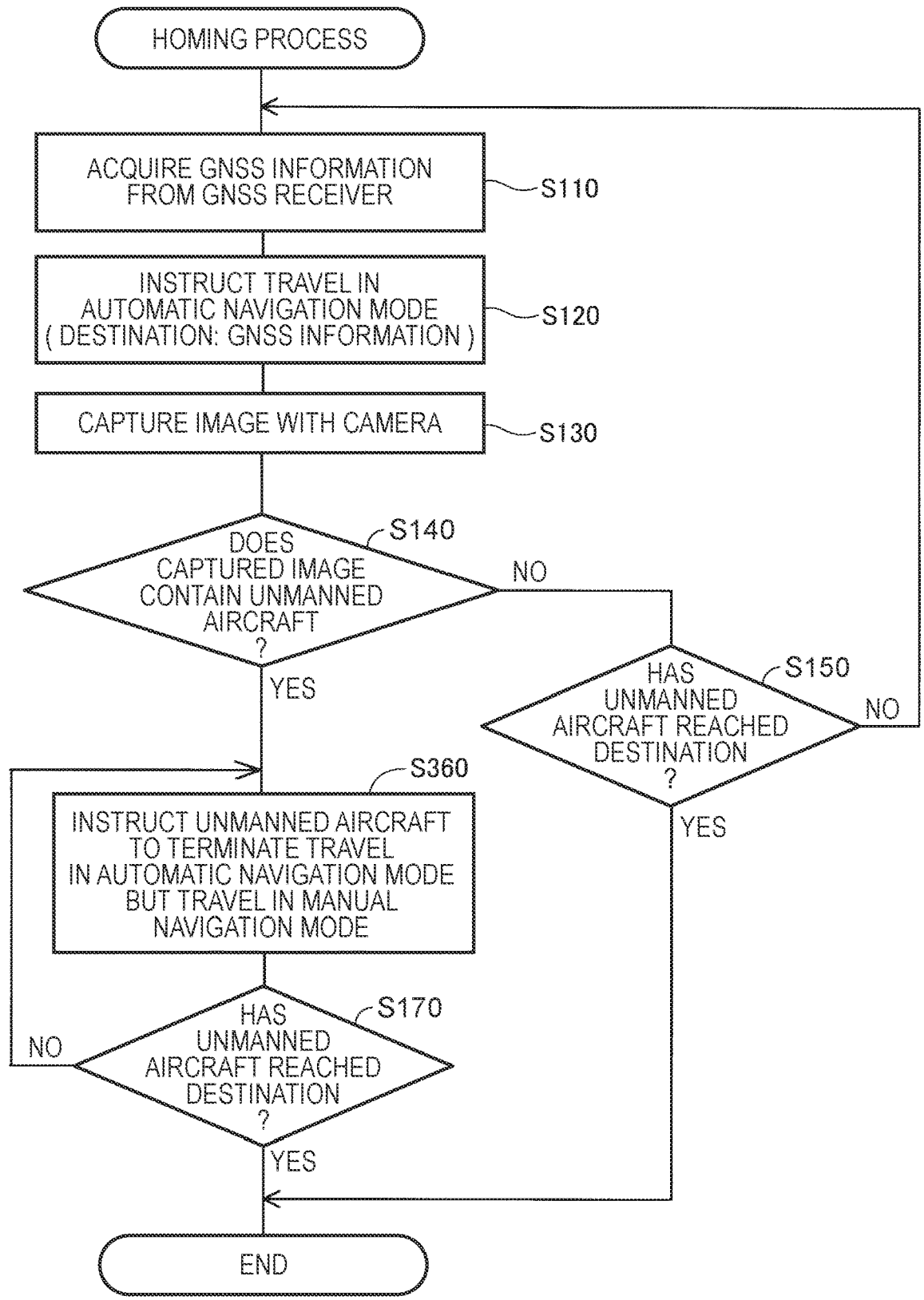
FIG. 13 is a flowchart showing the homing process carried out by an HMD according to a third embodiment.

FIG. 13 is a flowchart showing the homing process carried out by an HMD according to a third embodiment. The homing process carried out by the HMD according to the third embodiment differs from the homing process in the first embodiment (FIG. 9) in terms of the process in S360 corresponding to S160, and the processes in the other steps in the third embodiment are the same as those in the first embodiment. The hardware configuration of the HMD according to the third embodiment is the same as the hardware configuration of the HMD according to the first embodiment. In the following description, the same parts as those in the first embodiment have the same reference characters in the first embodiment.

In step S360 in the homing process in FIG. 13, the main processor 140 instructs the unmanned aircraft 400 to terminate the travel in the automatic navigation mode but travel in a manual navigation mode. That is, in the case where the unmanned aircraft 400 enters the visual field WA visually recognizable through the image display section 20, in place of the homing process in the first embodiment, in which the automatic navigation mode M1 is switched to the Wi-Fi navigation mode M2, the automatic navigation mode M1 is switched to the manual navigation mode in the homing process in the third embodiment.

Figure 14:
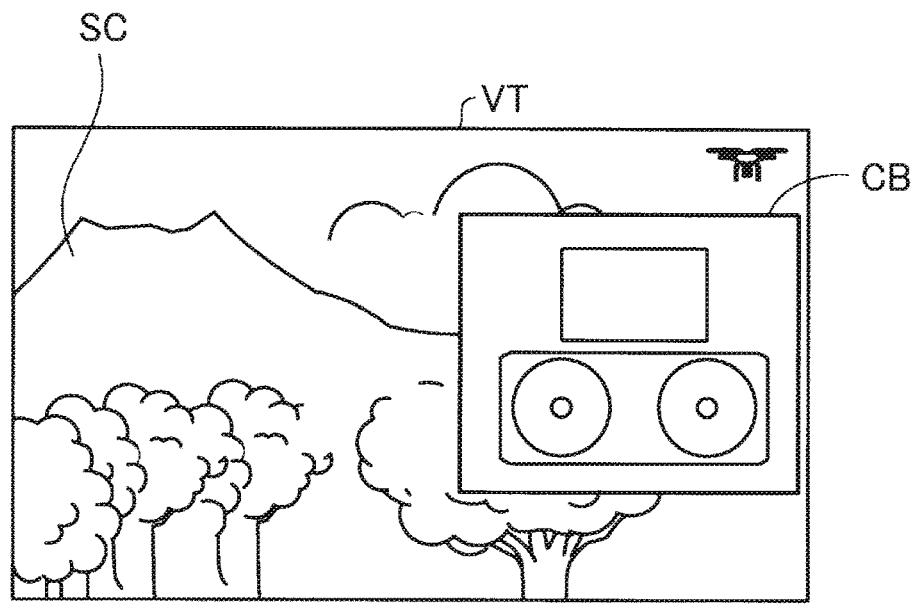
FIG. 14 is a descriptive diagram showing an operation screen in the third embodiment.

FIG. 14 is a descriptive diagram showing an operation screen CB, which is the software-version operation section 520 of the remote control apparatus 500 (FIG. 1). The operation screen CB is displayed by the image display section 20. The user uses the direction key 16 (FIG. 1) and the finalizing key 17 (FIG. 1) to perform input operation on the operation screen CB. In the manual navigation mode, the main processor 140 transmits an operation instruction inputted to the operation screen CB to the remote control apparatus 500 to allow the HMD 100 to maneuver the unmanned aircraft 400 by using the functions of the remote control apparatus 500.

In place of the configuration in which an operation instruction inputted to the operation screen is sent to the unmanned aircraft 400 via the remote control apparatus 500, the control apparatus may directly send an operation instruction to the unmanned aircraft 400 via the wireless communication section 117 (FIG. 5).

According to the thus configured HMD of the third embodiment, in the case where the unmanned aircraft 400 travels toward the control apparatus 10 in the automatic navigation mode M1 and enters the visual field WA visually recognizable through the image display section 20, the HMD 100 terminates the automatic navigation mode M1 using the GNSS information and causes the unmanned aircraft 400 to travel in the manual navigation mode. Therefore, since the HMD according to the third embodiment can terminate the travel in the automatic navigation mode M1 using low-accuracy GNSS information, the unmanned aircraft 400 is allowed to home to the HMD 100 with accuracy, as in the first and second embodiments.

As a variation of the third embodiment, the six-axis sensors 111 and 450 may each be replaced with an inertial sensor including only a three-axis acceleration sensor.

D. Fourth Embodiment

Figure 15:
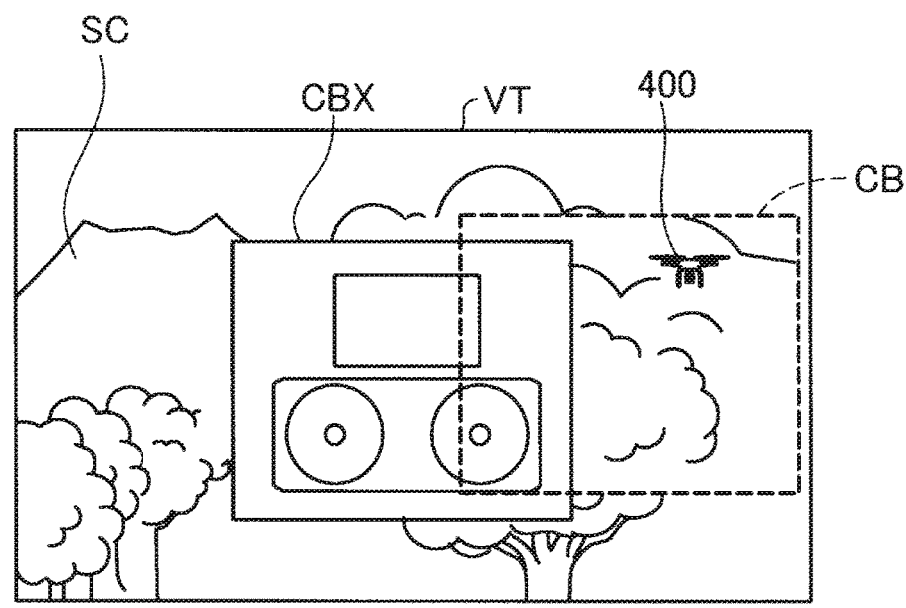
FIG. 15 is a descriptive diagram showing an operation screen in a fourth embodiment.

FIG. 15 is a descriptive diagram showing an operation screen CBX displayed in an HMD according to a fourth embodiment. The operation screen CBX corresponds to the operation screen CB (FIG. 14) in the third embodiment. The operation screen CBX differs from the operation screen CB in the third embodiment only in terms of the position where the operation screen is displayed by the image display section 20 and has the same shape and function as those of the operation screen CB in the third embodiment. The other software and hardware configurations of the HMD according to the fourth embodiment are the same as those of the HMD according to the third embodiment.

In FIG. 15, the broken line represents the position where the operation screen CB in the third embodiment is displayed. In the third embodiment, when the unmanned aircraft 400 enters the visual field VT, the position of the unmanned aircraft 400 in the visual field VT falls within the operation screen CB in some cases. In contrast, in the HMD according to the fourth embodiment, the position of the operation screen CBX is so changed as to separate from the position of the unmanned aircraft 400 in the visual field VT. Specifically, in S140 in FIG. 9, pattern matching is used to determine the position where the unmanned aircraft 400 is detected, the position of the unmanned aircraft 400 in the visual field VT is estimated from the determined position, and the operation screen CBX is moved to a position separate from the estimated position. As a result, the position of the unmanned aircraft 400 and therearound in the visual field VT can transmit the outside, whereby the user can reliably locate the unmanned aircraft 400.

The HMD according to the fourth embodiment can therefore home the unmanned aircraft 400 to the HMD 100 with accuracy, as in the third embodiment. In the HMD according to the fourth embodiment, in particular, the operation screen CBX does not hide the unmanned aircraft 400 in the visual field VT, whereby the operability of manual homing action of the unmanned aircraft 400 can be improved. The configuration in the present embodiment in which the display position of the operation screen CBX is so changed that the position of the unmanned aircraft 400 does not fall within the operation screen CBX may be employed also in the first and second embodiments.

E. Fifth Embodiment

Figure 16:
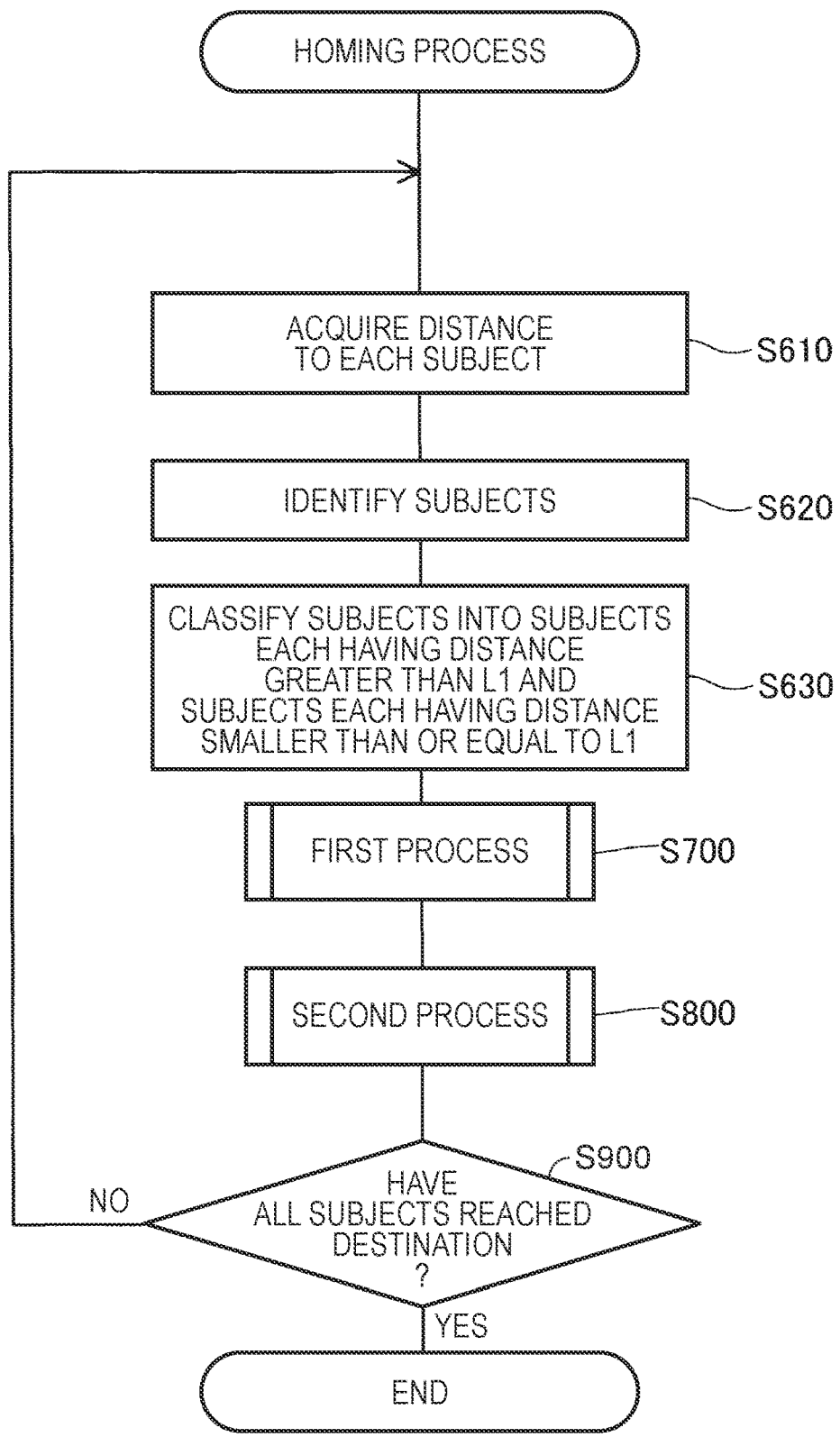
FIG. 16 is a flowchart showing the homing process carried out by an HMD according to a fifth embodiment.

FIG. 16 is a flowchart showing the homing process carried out by an HMD according to a fifth embodiment. The description of the fifth embodiment is primarily directed to a point different from those in the first embodiment. Points that will not be particularly described are the same as those in the first embodiment.

The homing process in the present embodiment can handle a plurality of unmanned aircrafts 400. The description will, however, first be made of a case where only one unmanned aircraft 400 is handled by way of example (hereinafter referred to as "a case of one subject"). A case where a plurality of unmanned aircrafts 400 are handled" will then be described. In a case where a plurality of unmanned aircrafts 400 differ from one another, each unmanned aircraft 400 is called a subject.

The main processor 140 first acquires the distance from each subject to the HMD 100 (hereinafter referred to as maneuver distance) (S610). In S610, the distance measuring sensor described in the first embodiment is used.

The main processor 140 then identifies each of the subjects, that are the unmanned aircrafts 400 (S620). However, S620, which is a step unnecessary in the case where the number of subjects is one, will be described later in conjunction with the description of the case where a plurality of unmanned aircrafts 400 are handled.

The main processor 140 then classifies the unmanned aircrafts 400 into subjects each satisfying the condition that the maneuver distance is greater than L1 and subjects each satisfying the condition that the maneuver distance is smaller than or equal to L1 (S630). In the case of one subject, the main processor 140 evaluates whether the maneuver distance of the subject is greater than L1 or smaller than or equal to L1.

Figure 17:
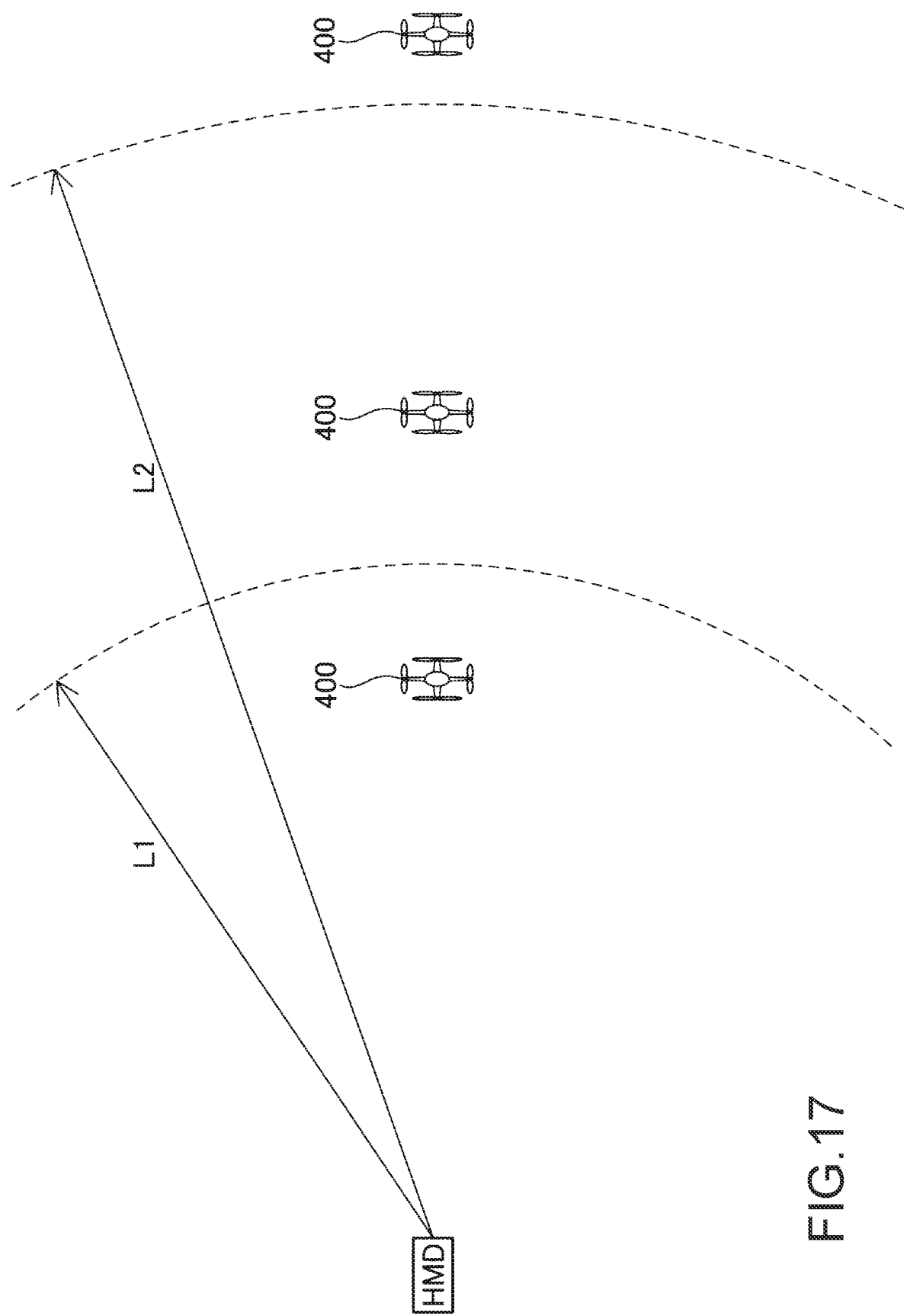
FIG. 17 shows L1 and L2.

FIG. 17 shows L1 and L2. L1 is, for example, 10 m. L1 is used as a boundary value for transition to the manual navigation mode, as will be described later. Regarding human vision, binocular parallax is most dominant for an object separate from the person by up to about 10 m and provides highest depth sensitivity. L1 in the present embodiment is therefore set at 10 m. In another form, the boundary value may, for example, range from 11 to 9 m.

L2 is longer than L1. In the present embodiment, L2 is, for example, 15 m. L2, which is used in a first process described later, will be described in conjunction with the first process.

Figure 18:
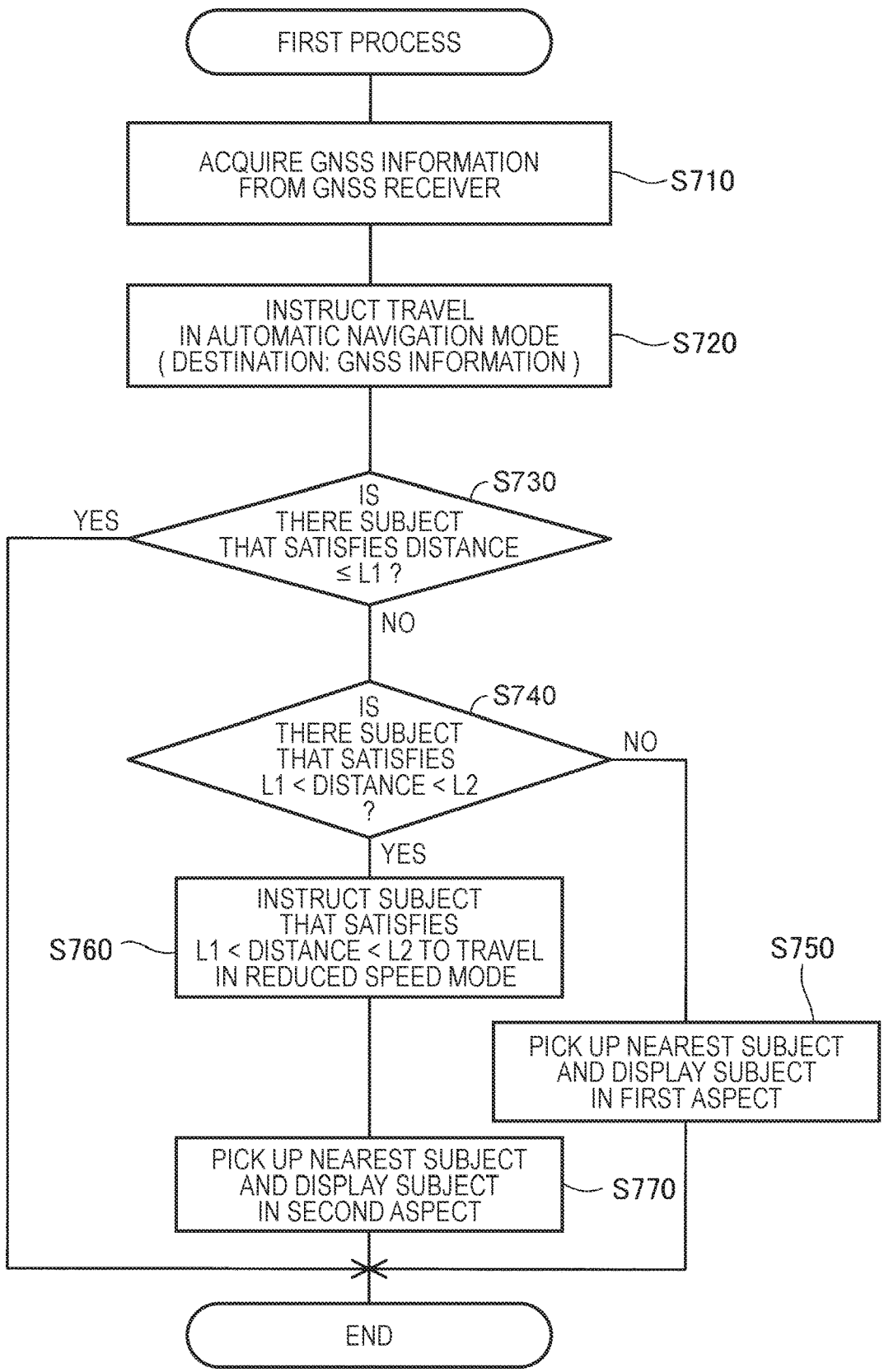
FIG. 18 is a flowchart showing a first process.

The main processor 140 then carries out the first process shown in FIG. 18 (S700). The first process is the process of handling subjects each satisfying the condition that the maneuver distance is greater than L1. The first process is therefore practically skipped in a case where there is no subject satisfying the condition that the maneuver distance is greater than L1.

The main processor 140 first acquires the GNSS information from the GNSS receiver 115 (S710). The main processor 140 then instructs the unmanned aircrafts 400 to travel in the automatic navigation mode M1 in which the position information contained in the acquired GNSS information is set as the destination (S720).

The main processor 140 then evaluates whether there is subjects each satisfying the condition that the maneuver distance is smaller than or equal to L1 (S730). In the case of one subject, and the maneuver distance of the subject is smaller than or equal to L1, the main processor 140 determines that the result of the process in S730 is YES and terminates the first process. On the other hand, in a case where the maneuver distance of any of the unmanned aircrafts 400 is greater than L1, the main processor 140 determines that the result of the process in S730 is NO and proceeds to S740.

The main processor 140 evaluates in S740 whether there is subjects each satisfying L1<maneuver distance<L2. In the case of one subject, in which the maneuver distance of the subject should be greater than L1, the main processor 140 evaluates in S740 whether the maneuver distance of the unmanned aircraft 400 is smaller than L2.

In a case where the maneuver distance of any of the unmanned aircrafts 400 is greater than or equal to L2, the main processor 140 determines that the result of the process in S740 is NO, picks up a subject satisfying the condition that the maneuver distance is shortest, and displays the subject in a first aspect (S750). In the case of one subject, the subject satisfying the condition that the maneuver distance is shortest is the one subject itself.

Figure 19:
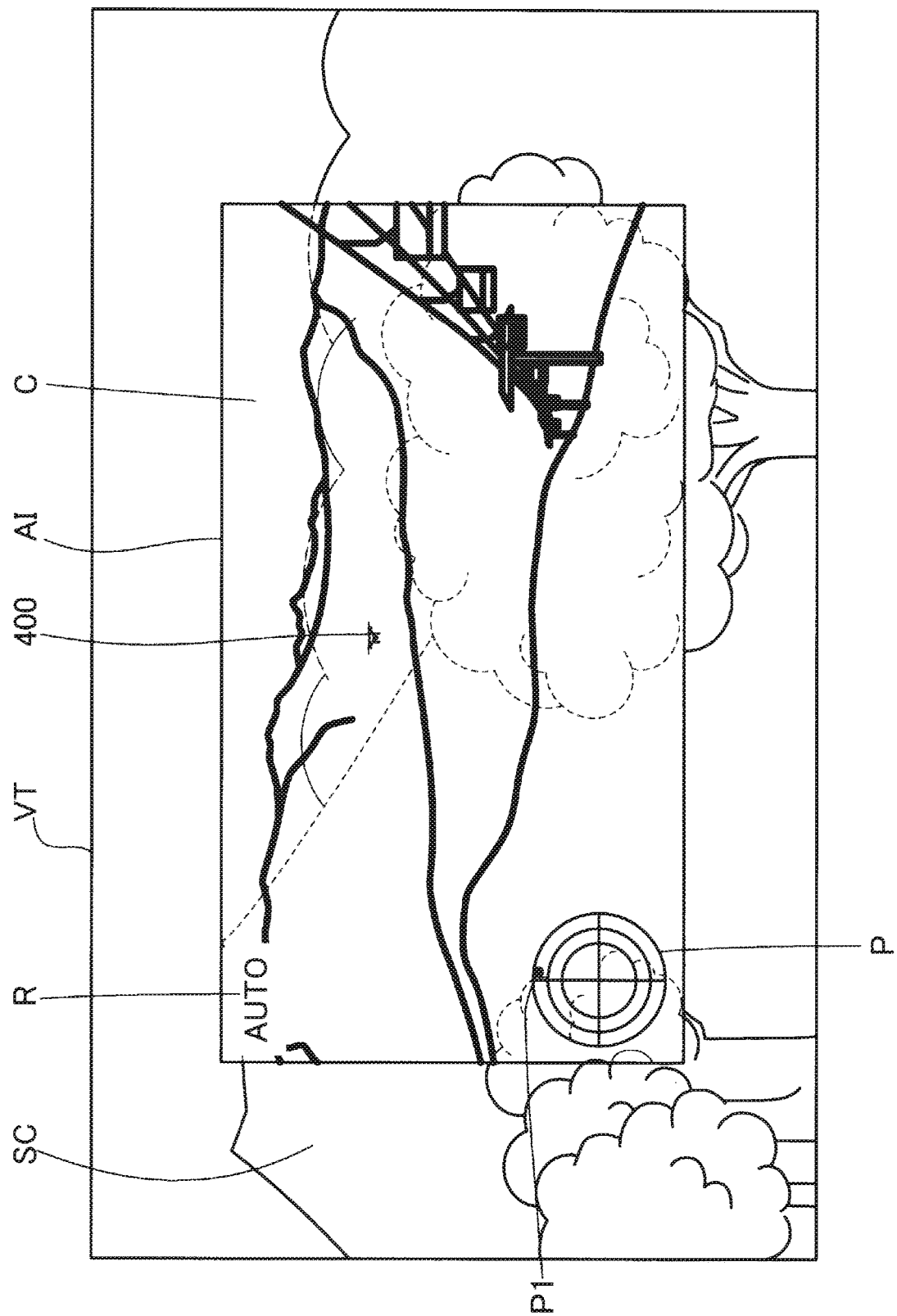
FIG. 19 shows an example of display operation in a first aspect.

FIG. 19 shows an example of the display operation in the first aspect. In the first aspect, an unmanned vehicle image C captured with the camera 420 of the unmanned aircraft 400 is displayed over the entire range displayable as the image AI.

In the portion where the image AI is displayed in the visual field VT, the user of the HMD 100 can view the outside SC on which the image AI is superimposed. In FIG. 19, the outside SC on which the image AI is superimposed is drawn with broken lines. The unmanned aircraft 400 shown in FIG. 19 is visually recognized as part of the outside SC on which the image AI is superimposed. The unmanned aircraft 400 is viewed as a small object because the maneuver distance of the unmanned aircraft 400 is greater than or equal to L2.

The display operation in the first aspect includes displaying a navigation mode R and position information P, as shown in FIG. 19. Display operation in second and third aspects, which will be described later, also includes displaying the navigation mode R and the position information P. The navigation mode R is information representing the navigation mode. FIG. 19 shows letters "AUTO" as the navigation mode R. "AUTO" represents the automatic navigation mode and further indicates that the display operation in the first aspect is performed.

The position information P represents the position of an unmanned aircraft 400. The position information P, which is provided in the form of a point plotted with respect to a vertical line, a horizontal line, and three concentric circles, shows the maneuver distance and orientation of the unmanned aircraft 400. FIG. 19 shows a plotted point P1.

The intersection of the vertical line and the horizontal line coincides with the center of the three concentric circles. The position information P shows the information on the maneuver distance and the orientation in a polar coordinate system. That is, the information on the maneuver distance is shown in the form of the radius vector. The radius vector is the distance between a plotted point and the center of the concentric circles. The radius of the circle having the shortest radius out of the three concentric circles corresponds to L1. The radius of the circle having the second shortest radius out of the three concentric circles corresponds to L2.

The information on the orientation is shown in the form of the argument. The argument is the angle between the vertical line and an imaginary line. The imaginary line is an imaginary line that is not displayed but connects the plotted point to the center of the concentric circles. In a case where the unmanned aircraft 400 is located exactly in front of the HMD 100, the point is plotted on the vertical line and above the center.

On the other hand, in a case where the maneuver distance of one of the unmanned aircrafts 400 described above is smaller than L2, the main processor 140 determines that the result of the process in S740 is YES and proceeds to S760. In S750, the main processor 140 instructs a subject that satisfies L1<maneuver distance<L2 to travel in a reduced speed mode. The reduced speed mode is a mode in which a subject automatically travels at a speed slower than the speed in the typical automatic navigation mode.

Figure 20:
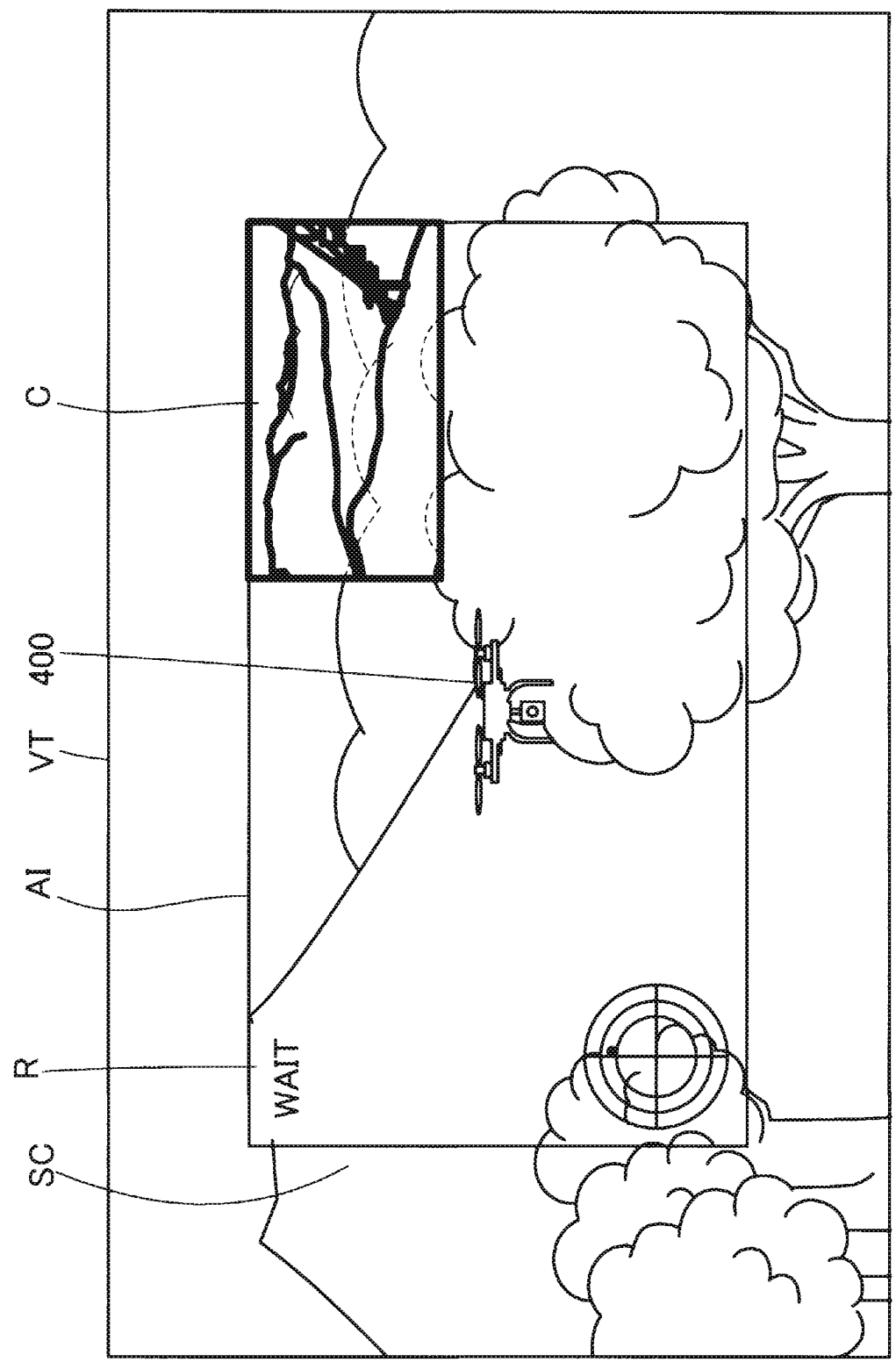
FIG. 20 shows an example of display operation in a second aspect.

The main processor 140 then picks up a subject satisfying the condition that the maneuver distance is shortest and displays the subject in a second aspect (S770). FIG. 20 shows an example of the display operation in the second aspect. In the second aspect, the unmanned vehicle image C is displayed in part of the range displayable as the image AI. The reason why the display operation in the second aspect is performed as described above is that the unmanned aircraft 400 as part of the outside SC is readily visually recognized. The navigation mode R in the second aspect shows letters "WAIT." "WAIT" indicates that the navigation mode is not the manual mode (that is, the navigation mode is the automatic navigation mode), and that the display operation in the second aspect is performed.

Having completed S750 or S770, the main processor 140 terminates the first process and carries out a second process (S800).

Figure 21:
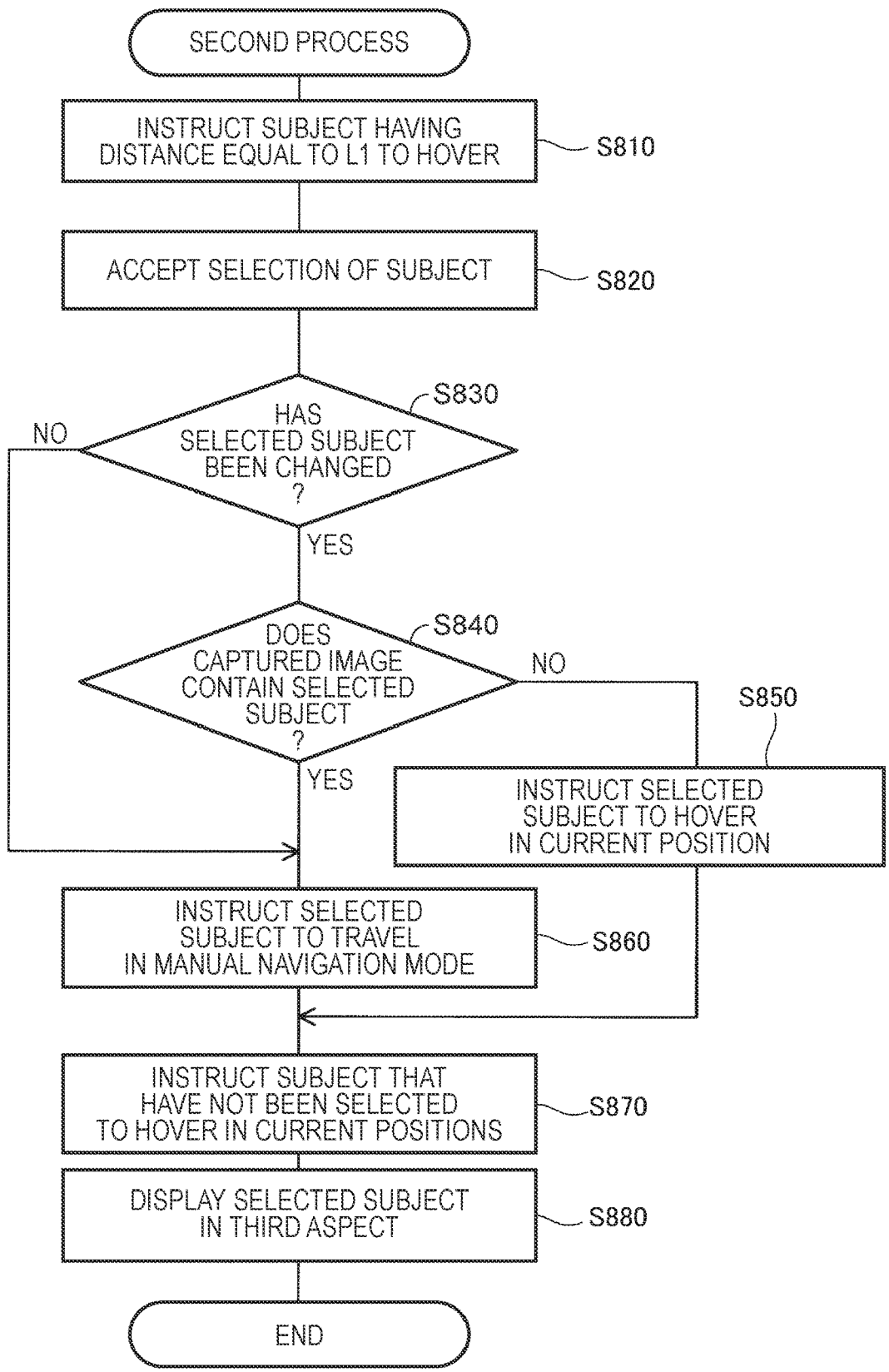
FIG. 21 is a flowchart showing a second process.

FIG. 21 is a flowchart showing the second process. The second process is the process of handling subjects each satisfying the condition that the maneuver distance is smaller than or equal to L1. Therefore, in a case where there is no subject satisfying the condition that the maneuver distance is smaller than or equal to L1, the second process is practically skipped.

The main processor 140 first instructs subjects each satisfying the condition that the maneuver distance is equal to L1 to hover (S810). The subjects each instructed to hover in S810 hover in positions where the maneuver distance is L1. A subject that starts the homing process from a position where the maneuver distance is greater than L1 hovers at least once in S810. The subjects instructed to hover in S810 keep hovering until they are instructed to travel in the manual navigation mode in S860, which will be described later.

The main processor 140 then accepts selection of a subject (S820). The selection of a subject is selection of a subject caused to travel in the manual navigation mode. In the case of one subject, the subject itself is automatically selected in S820.

The main processor 140 then evaluates whether the subject that had been selected (hereinafter referred to as selected subject) has been changed (S830). The case where the selected subject has been changed includes a case where a certain subject is selected in a state in which there is no selected subject. Therefore, in the case of one subject, the main processor 140 determines that the result of the process in S830 is YES when the maneuver distance of the subject reaches L1, and the main processor 140 proceeds to S840.

Having proceeded to S840, the main processor 140 evaluates whether or not an image captured with the camera 61 contains the selected subject. In a case where the captured image does not contain the selected subject (NO in S840), the main processor 140 instructs the selected subject to hover (S850). On the other hand, in a case where the captured image contains the selected subject (YES in S840), the main processor 140 instructs the selected subject to travel in the manual navigation mode (S860).

After S850 or S860, the main processor 140 instructs subjects that have not been selected to hover in their current positions (S870). In the case of one subject, S870 is practically skipped. The main processor 140 then displays the selected subject in a third aspect (S880) and terminates the second process.

Figure 22:
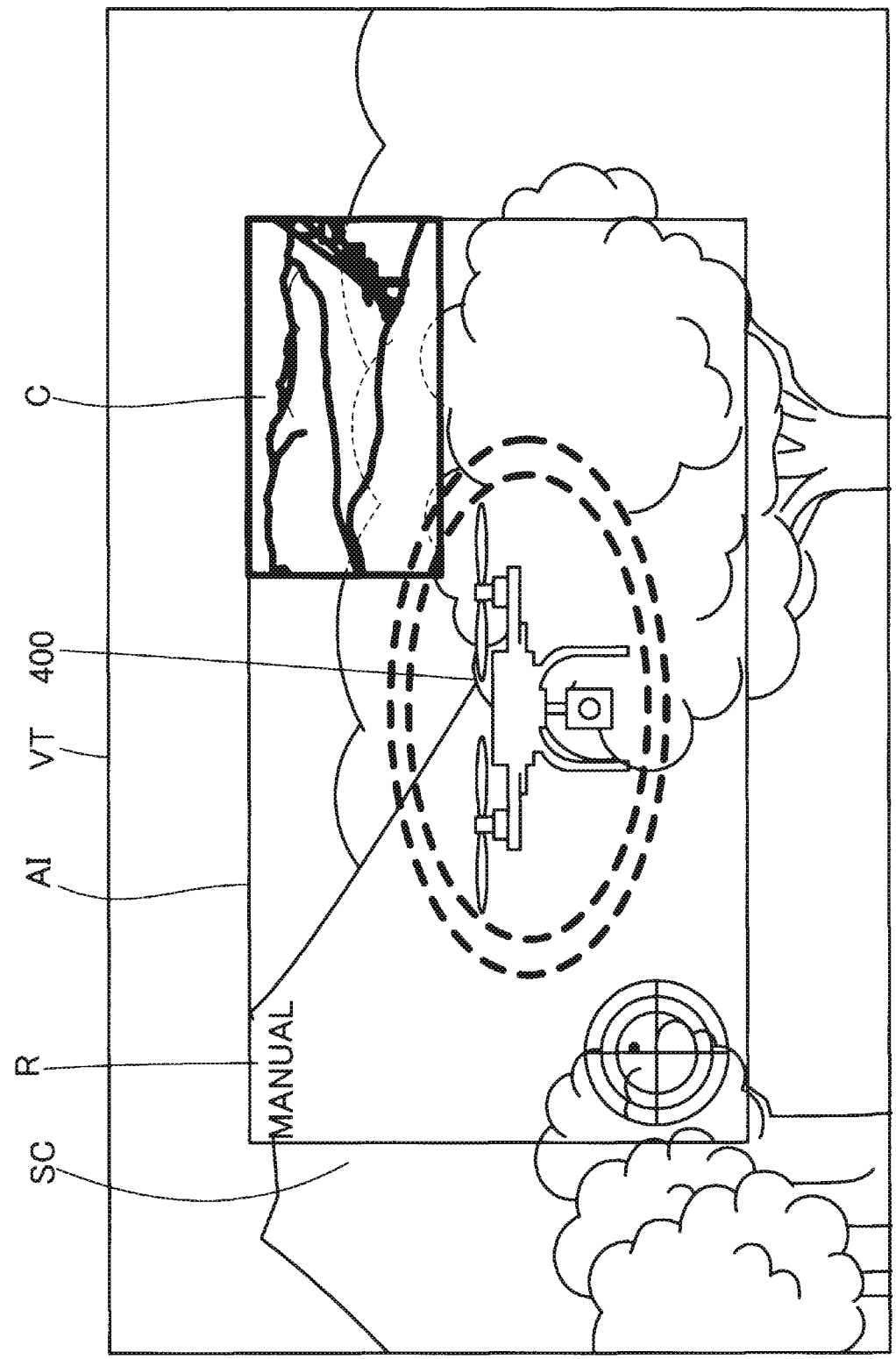
FIG. 22 shows an example of display operation in a third aspect.

FIG. 22 shows an example of the display operation in the third aspect. In the third aspect, the navigation mode R shows "MANUAL." "MANUAL" represents the manual navigation mode and further indicates that the display operation in the third aspect is performed. In the third aspect, the selected subject is surrounded with double broken lines as enhancement display operation.

Having completed the second process, the main processor 140 evaluates whether all subjects have reached the destination (S900). In the case of one subject, the main processor 140 evaluates whether the subject has reached the destination. In a case where the subject has not reached the destination (NO in S900), the main processor 140 returns to S610. In a case where the subject has reached the destination (YES in S900), the main processor 140 terminates the homing process.

The case where a plurality of unmanned aircrafts 400 are handled will subsequently be described. Steps that do not particularly differ from those in the case of one subject will not be described as appropriate.

The main processor 140 identifies the subjects in S620. In the present embodiment, unique identification symbols are assigned to the plurality of unmanned aircrafts 400. The unmanned aircrafts 400 each use the wireless communication section 460 to regularly transmit its identification number and the GNSS information acquired by the GNSS receiver 440. The two pieces of information are collectively called identification information.

The main processor 140 uses the identification symbols to separate subjects to be maneuvered and subjects not to be maneuvered from each other. The main processor 140 estimates a most probable combination of the maneuver distance and the identification number of each of the subjects to be maneuvered in consideration of the maneuver distance of the subject acquired in S610, the identification information received from the subject, and the GNSS information on the control apparatus 10 acquired by the GNSS receiver 115. The process in S620 is thus carried out.

In another form, in addition to or in place of the identification number, a subject may be estimated based on the sight of the aircraft or based on the travel path and the position of the subject.

The first process will next be described, and the description will be made of S730 and the following steps. In the case where there are subjects each satisfying the condition that the maneuver distance is smaller than or equal to L1 (YES in S730), the first process is terminated to skip S740 to S770 for the display operation in the third aspect.

Figure 23:
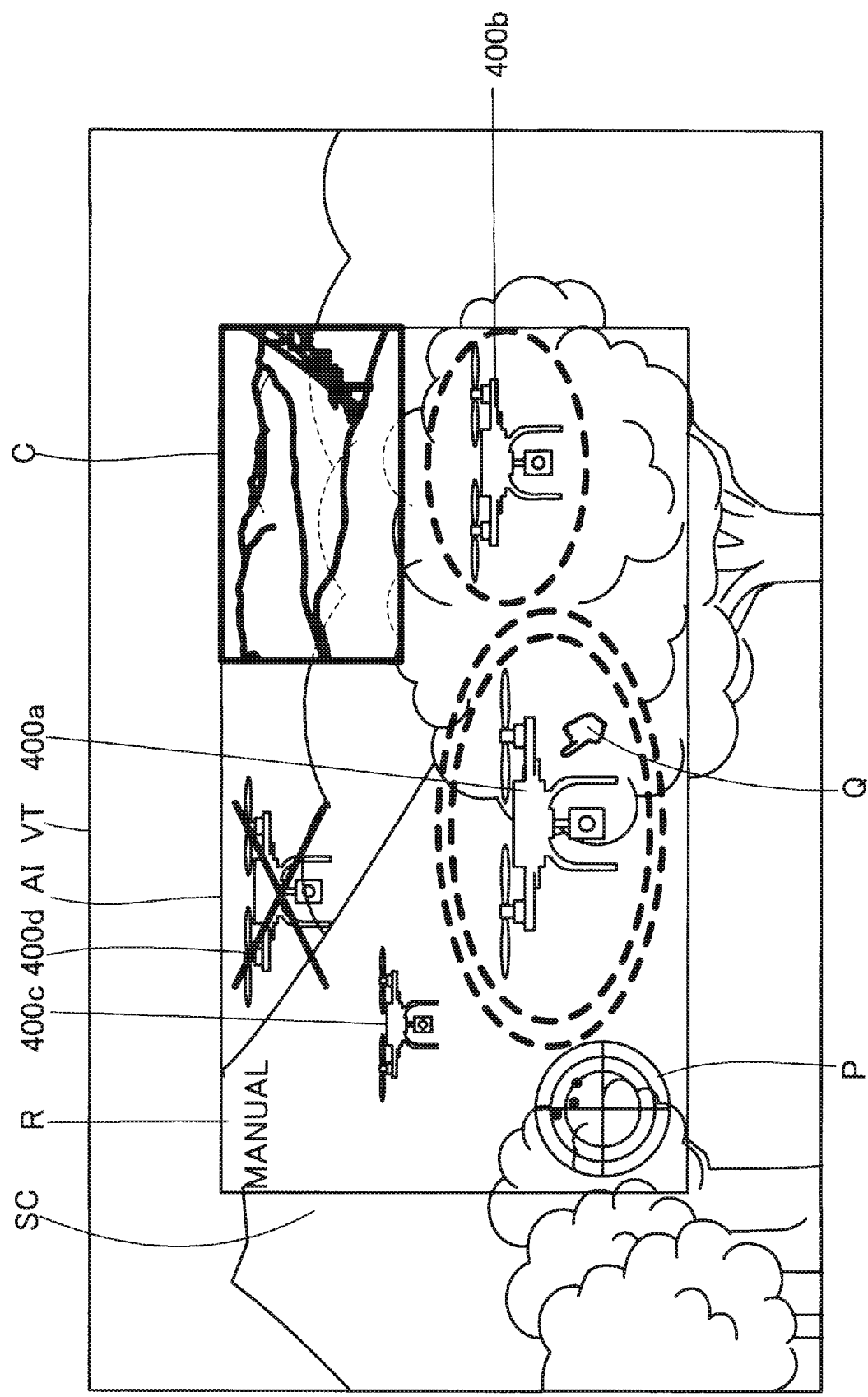
FIG. 23 shows an example of the display operation in a third embodiment in a case where there are a plurality of subjects.

FIG. 23 shows an example of the display operation in the third embodiment in the case where there are a plurality of subjects. FIG. 23 shows unmanned aircrafts 400a, 400b, and 400c as the subjects to be maneuvered and an unmanned aircraft 400d as the subject not to be maneuvered.

The maneuver distance of the unmanned aircraft 400a is smaller than L1. The maneuver distance of the unmanned aircraft 400b is equal to L1. The maneuver distance of each of the unmanned aircrafts 400c and 400d is greater than L1 but smaller than L2.

In the third aspect, the selected subject is surrounded with double broken lines. In the case shown in FIG. 23, since the unmanned aircraft 400a is the selected subject, the double broken lines are displayed around the unmanned aircraft 400a.

In the third aspect, a single broken line is displayed around a subject that is selectable but has not been selected. A selectable subject is a subject that satisfies the following conditions: The maneuver distance is smaller than or equal to L1; and the subject has entered the visual field WA. In the case shown in FIG. 23, since the unmanned aircraft 400b corresponds to the selectable subject that has not been selected, the single broken line is displayed around the unmanned aircraft 400b.

In the present embodiment, the selection of a subject is performed by using a pointer Q. The pointer Q is displayed in the form of a virtual image in the image AI. The user can move the position of the pointer Q by using the operation section 110. When the user uses the operation 110 to select a subject that the user desires to select with the pointer Q overlaid on the sight of the subject, the subject corresponding to the sight of the subject is selected. When a new subject is selected, the subject having been selected becomes a non-selected subject and is instructed to hover in the current position (S870).

In the present embodiment, the selection of a subject can instead be performed by selection of the point displayed as the position information P.

In the third aspect, the sight of a subject that is not to be maneuvered and satisfies the condition that the maneuver distance is smaller than or equal to L2 is so displayed that an image representing that the subject is not to be maneuvered is overlaid on the sight of the subject. In FIG. 23, an X-letter-shaped image is so displayed as to be overlaid on the unmanned aircraft 400d.

According to the present embodiment, since the aspect of the display operation is changed in accordance with the maneuver distance, the user readily visually recognizes an unmanned aircraft 400 when it homes in the manual navigation mode. Further, to home a plurality of unmanned aircrafts 400 in the manual navigation mode, the unmanned aircrafts 400 can be sequentially landed at the destination because they can be individually maneuvered one by one.

F. Sixth Embodiment

A sixth embodiment will be described. The description of the sixth embodiment is primarily directed to a point different from those in the fifth embodiment. Points that will not be particularly described are the same as those in the fifth embodiment.

Figure 24:
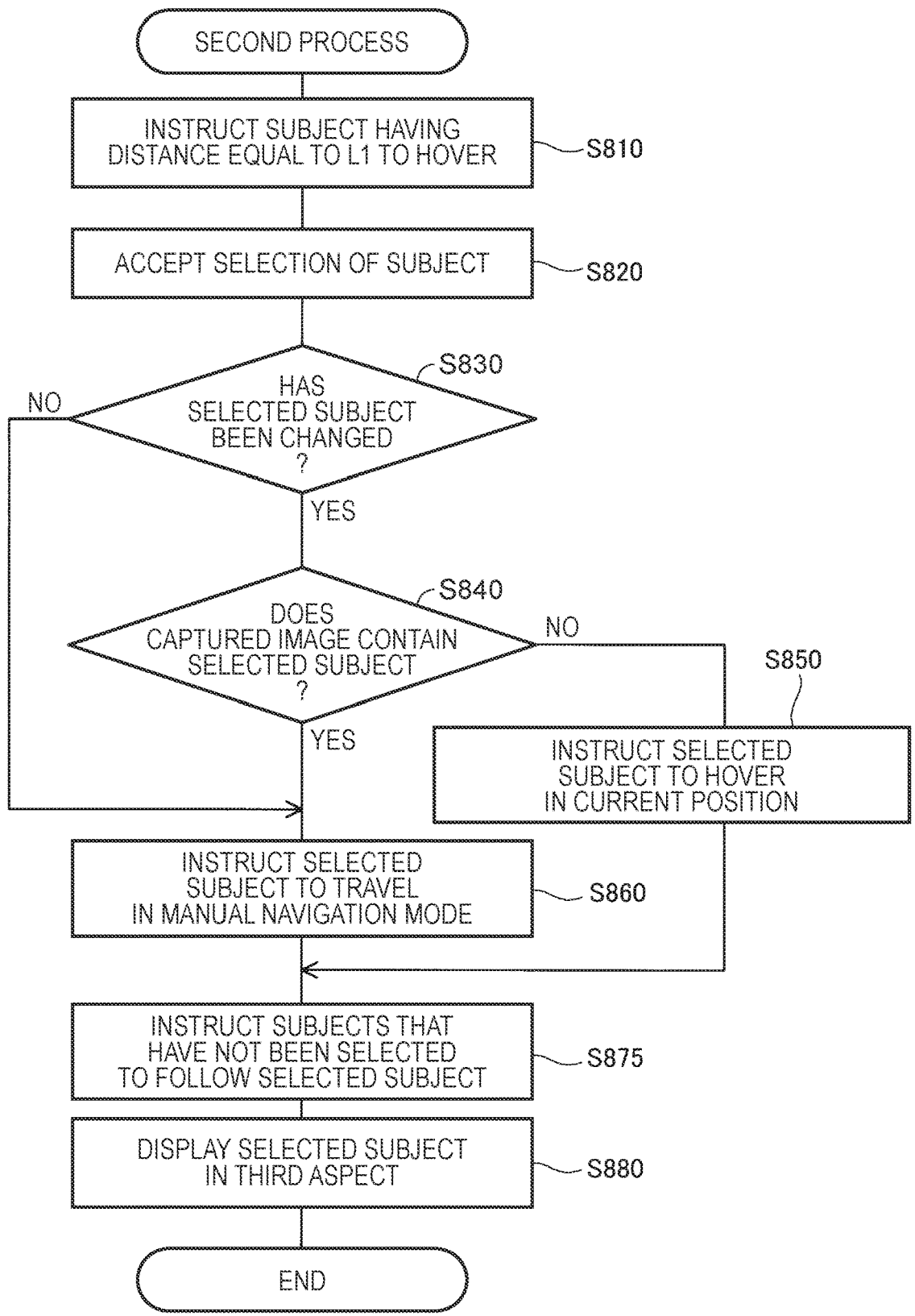
FIG. 24 is a flowchart showing the second process in a sixth embodiment.

FIG. 24 is a flowchart showing the second process in the sixth embodiment. In the sixth embodiment, S870 carried out in the fifth embodiment is replaced with S875. In S875, the main processor 140 instructs a subject that has not been selected to automatically travel and follow a selected subject (hereinafter referred to as following navigation).

In a case where only one subject has been instructed to travel in the following navigation, the subject travels in such a way that a predetermined maneuver distance from the subject to the selected subject is maintained. The maneuver distance to the selected subject is estimated based on an image captured with the camera 420. After the selected subject reaches the destination, the subject that travels in the following navigation lands in the automatic navigation in the vicinity of the landed selected subject.

In a case where a plurality of subjects have been instructed to travel in the following navigation, a subject closest to the selected subject out of the plurality of subjects travels in such a way that the maneuver distance to the selected subject is maintained at the predetermined maneuver distance. Out of the plurality of subjects having been instructed to travel in the following navigation, a subject satisfying the condition that the maneuver distance to the selected subject is n-th closest (n is integer greater than or equal to 2) travels in such a way that the maneuver distance to a subject satisfying the condition that the maneuver distance to the subject is (n-1)-th closest is maintained at the predetermined distance. According to the present embodiment, the plurality of subjects are allowed to home at once.

G. Seventh Embodiment

A seventh embodiment will be described. The description of the seventh embodiment is primarily directed to a point different from the points in the fifth embodiment. Points that will not be particularly described are the same as those in the fifth embodiment.

Figure 25:
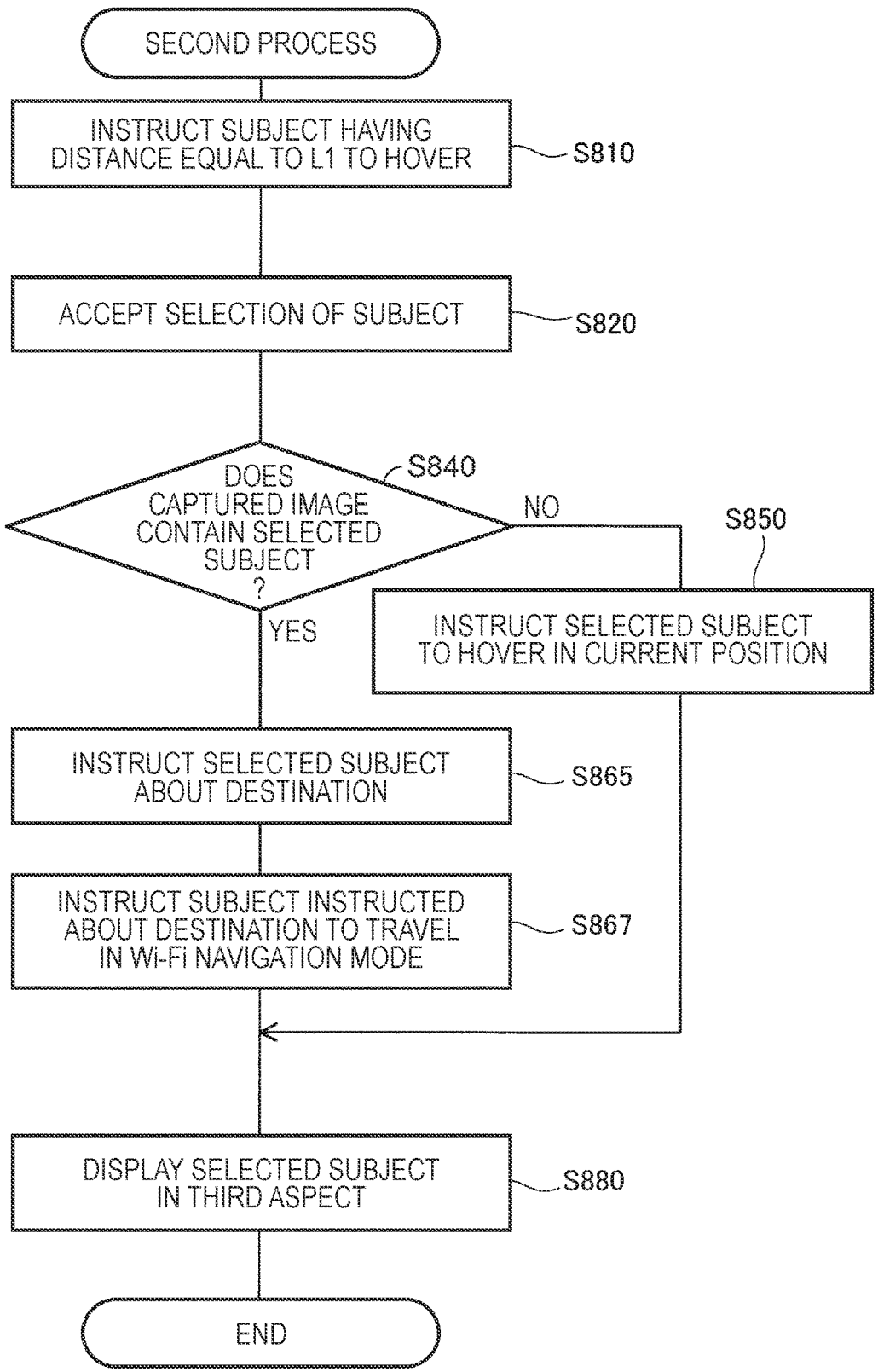
FIG. 25 is a flowchart showing the second process in a seventh embodiment.

FIG. 25 is a flowchart showing the second process in the seventh embodiment. In the seventh embodiment, S830 and S870 in the fifth embodiment are omitted. Therefore, when a subject is selected (S820), S840 is carried out. In the case where it is determined that the result of the process in S840 is YES, S865 and S867 are carried out in place of S860.

The main processor 140 instructs the selected subject about the destination in S865. In the fifth embodiment, the takeoff point is specified as the destination (S720), as in the first embodiment. The situation in which the takeoff point is specified as the destination in S720 also applies to the seventh embodiment. It is, however, noted in the seventh embodiment that the instruction in S720 is a temporary destination, and the destination is specified anew in S865.

Figure 26:
FIG. 26 shows an example of an image for specifying a destination.

FIG. 26 shows an example of the image AI for specifying the destination. In S865, a map is displayed as the image AI. The user operates the pointer Q to specify the destination. In another form, the user may use a tablet terminal or any other apparatus to specify the destination.

The main processor 140 instructs the subject instructed about the destination in S865 to travel in the Wi-Fi navigation mode (S867). In another form, the main processor 140 may instruct the subject to travel in the dead reckoning navigation mode. In the present embodiment, a subject having been once instructed to travel in the Wi-Fi navigation mode is excluded from the selection targets in S820. According to the present embodiment, a plurality of subjects are automatically allowed to land on different destinations.

H. Eighth Embodiment

An eighth embodiment will be described. The description of the eighth embodiment is primarily directed to a point different from the points in the fifth embodiment. Points that will not be particularly described are the same as those in the fifth embodiment.

Figure 27:
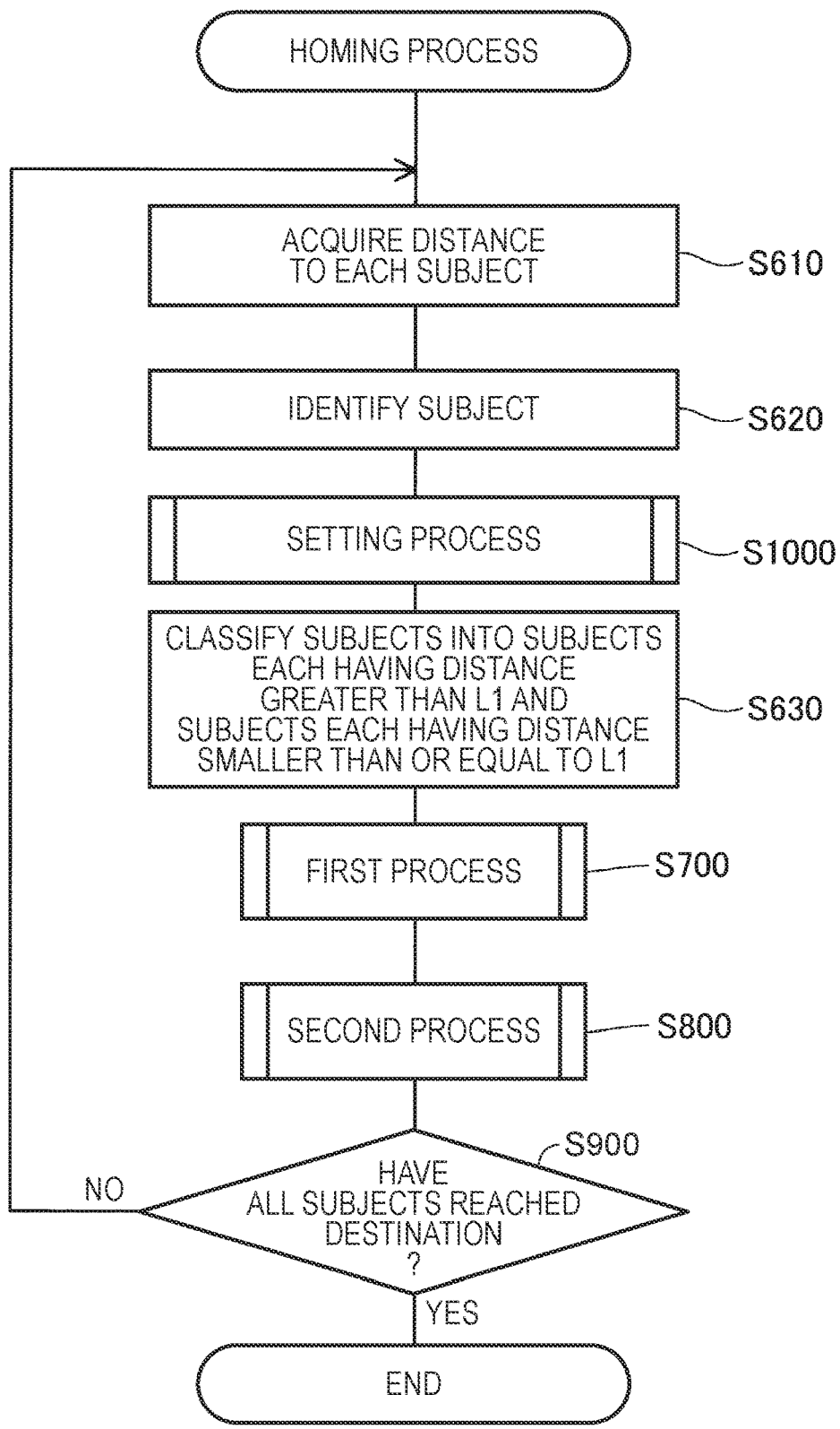
FIG. 27 is a flowchart showing the homing process in an eighth embodiment.

FIG. 27 is a flowchart showing the homing process in the eighth embodiment. In the eighth embodiment, after S620 but before S630, a setting process is carried out (S1000).

Figure 28:
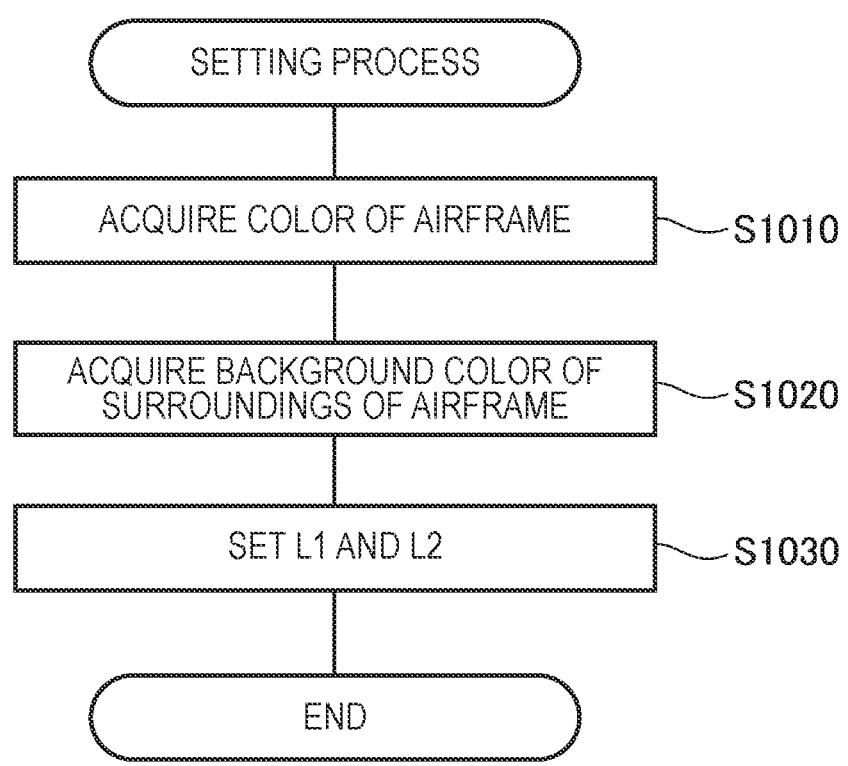
FIG. 28 is a flowchart showing a setting process.

FIG. 28 is a flowchart showing the setting process. The main processor 140 acquires the color of the airframe of each subject from an image captured with the camera 420 (S1010). The main processor 140 subsequently acquires the background color of the surroundings of each subject from the image captured with the camera 420 (S1020).

The main processor 140 subsequently sets distances as L1 and L2 on a subject basis (S1030). In S1030, the results of the acquisition in S1010 and S1020 are used. Specifically, in relation to the background color, in a case where the airframe is easily seen, the values of L1 and L2 are set at relatively larger values, whereas in a case where the airframe is not easily seen, the values of L1 and L2 are set at relatively smaller values. The main processor 140 determines how easy the airframe is seen based on the magnitude of the contrast between the background color and the color of the airframe. According to the present embodiment, L1 and L2 can be set at appropriate values.

I. Variations

The disclosure is not limited to the embodiments and variations thereof described above and can be implemented in a variety of other aspects to the extent that they do not depart from the substance of the disclosure. For example, the following variations are also conceivable.

Variation 1:

In each of the embodiments and variations, the unmanned aircraft system includes the HMD 100, the unmanned aircraft 400, and the remote control apparatus 500. In contrast, as a variation, the unmanned aircraft system may have a configuration including the HMD 100 and the unmanned aircraft 400 but no remote control apparatus 500. In this case, all functions of the remote control apparatus 500 are achieved by software performed by the HMD 100.

Variation 2:

In each of the embodiments and variations, the GNSS information, which specifies the destination in the automatic navigation mode, is acquired by the GNSS receiver 115 provided in the control apparatus 10 of the HMD 100. In contrast, as a variation, a GNSS receiver may be provided in the image display section 20 of the HMD 100, and the GNSS information may be acquired from the GNSS receiver. Still instead, the GNSS information acquired by the GNSS receiver 530 provided in the remote control apparatus 500 may be acquired from the remote control apparatus 500.

Variation 3:

In each of the embodiments and variations, the GNSS receiver 115 is provided in the control apparatus 10 of the HMD 100, and the automatic navigation mode causes the unmanned aircraft 400 to home to the current position of the control apparatus 10 of the HMD 100. In contrast, as a variation, the GNSS receiver may be provided in a position separate from the head mounted display, and the unmanned aircraft 400 may be caused to travel to the position of the GNSS receiver. For example, the GNSS receiver may be disposed in a pre-specified position in a predetermined facility, and the position of the GNSS receiver may be used as the destination in the automatic navigation mode. In this case, the unmanned aircraft travels into the predetermined facility in the automatic navigation mode, and the user of the HMD can go to the facility and cause the unmanned aircraft to travel in a specific navigation mode different from the automatic navigation mode.

Still instead, after the unmanned aircraft 400 leaves from a home position as the departure point, the unmanned aircraft 400 may be caused to home to the home position. The home position is a position arbitrarily determined by the user as the departure point and the homing destination. The user may place the unmanned aircraft 400 in a position determined as the home position and use the position as the home position. To home to the home position, the unmanned aircraft 400 may acquire position/attitude information, such as the GNSS information, in the home position before departure and transmit the information to the head mounted display 100. In this case, since the unmanned aircraft 400 only needs to provide the position information in the home position to the head mounted display 100, a portable GNSS receiver may, for example, be installed in an arbitrary position, and the position may be used as the home position. The GNSS receiver installed in the home position may be removed after the departure of the unmanned aircraft 400. The head mounted display 100 stores the transmitted position/attitude information as the destination. The head mounted display 100 uses the stored destination as the destination in the automatic navigation mode and the specific navigation mode. Using the method described above, for example, allows the automatic navigation mode to be switched to the specific navigation mode without the need for the user to go to a facility where a GNSS receiver is installed.

Variation 4:

In each of the embodiments and variations, on the assumption that an image captured with the camera 61 coincides with the visual field WA visually recognizable through the image display section 20, the image captured with the camera 61 is used to evaluate whether or not the unmanned aircraft 400 has entered the visual field WA. In contrast, as a variation, on the assumption that the six-axis sensor 235 and the magnetic sensor 237, which are provided in the image display section 20, determine the orientation of the image display section 20, and that the orientation allows identification of the visual field WA visually recognizable through the image display section 20, whether or not the unmanned aircraft 400 has entered the visual field WA may be evaluated based on the orientation and the position indicated by the GNSS information acquired by the GNSS receiver 440 of the unmanned aircraft 400. The configuration described above also provides the same advantageous effects provided by each of the embodiments and variations.

Further, as another variation, in a case where the distance measuring sensor described above detects the distance to the unmanned aircraft 400, and the detected distance is smaller than or equal to a predetermined value, it may be determined that the unmanned aircraft 400 has entered the visual field WA. In a case where the predetermined value described above is set at a value ranging, for example, from 11 to 9 m, and the distance to the unmanned aircraft is smaller than or equal to the predetermined value, it is determined that the unmanned aircraft 400 has entered the visual field WA. The configuration described above also provides the same advantageous effects provided by each of the embodiments and variations. The predetermined value described above can, for example, be 10 m.

Further, as another variation, in place of an image captured with the camera 61, an image captured with the camera 420 of the unmanned aircraft 400 may be used to evaluate whether or not the unmanned aircraft 400 has entered the visual field WA. Specifically, whether or not the unmanned aircraft 400 has entered the visual field WA is evaluated based on whether or not an image captured with the camera 420 of the unmanned aircraft 400 contains the user on whom the HMD 100 is mounted. The configuration described above also provides the same advantageous effects provided by each of the embodiments and variations. Further, an image captured with the camera 420 and displayed on the display 510 of the remote control apparatus 500 (see FIG. 8) may be acquired from the remote control apparatus 500, and the captured image may be used to evaluate whether or not the unmanned aircraft 400 has entered the visual field WA.

Variation 5:

In each of the embodiments and variations, in the case where the unmanned aircraft 400 enters the visual field WA during the travel in the automatic navigation mode, the automatic navigation mode is witched to the Wi-Fi navigation mode. In contrast, as a variation, after the navigation mode is switched to the Wi-Fi navigation mode, in a case where the unmanned aircraft 400 turns in a direction away from the user, and the unmanned aircraft 400 moves out of the visual field WA, the Wi-Fi navigation mode may be switched to the automatic navigation mode. Further, the present disclosure is applicable to even a case where after the unmanned aircraft 400 exits out of the user's visual field, the unmanned aircraft 400 enters the visual field again or the unmanned aircraft 400 repeatedly enters and exits out of the visual field.

Variation 6:

In the second embodiment, the position and attitude of the control apparatus of the HMD are determined based on a detection signal from the six-axis sensor 111 (FIG. 5). In contrast, as a variation, in addition to the detection signal from the six-axis sensor 111, a GNSS detection signal and an image captured with the camera may be used to determine the position and attitude of the control apparatus of the HMD with accuracy. Further, another HMD including a camera and a communication apparatus may be configured to be capable of observation of the position and attitude of the user's HMD (HMD to which present disclosure is applied), and the observed position and attitude may be received from the other HMD over communication for determination of the position and attitude of the user's HMD.

Variation 7:

In the dead reckoning navigation mode in the second embodiment, the initial value is set by using the value of the detection signal (detection value) from the six-axis sensor 450 before the unmanned aircraft 400 takes off. In contrast, as a variation, the position and attitude of the unmanned aircraft 400 before it takes off may be determined from an image captured with the camera 61 of the HMD, and the determined position and attitude may be used as the initial value. The camera 61 may be a stereocamera. Instead, the camera 61 may be a monocular camera. In this case, two or more captured images may be used to determine the distance based on the triangulation principle, and the determined position and attitude may be used as the initial value. Still instead, the position and attitude of the unmanned aircraft 400 may not be those before the unmanned aircraft 400 takes off but may be those after takeoff and in a predetermined state. Specifically, after takeoff, the unmanned aircraft may be caused to hover at a predetermined height specified in advance, and the position and attitude at this point of time may be used as the initial value.

Variation 8:

In each of the embodiments and variations, an unmanned aircraft capable of remote maneuver or autonomous flight, such as a drone, has been described by way of example, but not necessarily, and the present disclosure is also applicable to an unmanned ground vehicle, an unmanned on-water vessel, an unmanned on-water boat, an unmanned on-water ship, an unmanned submarine, an unmanned under-water vehicle, an unmanned spaceship, and other unmanned vehicles.

Variation 9:

In each of the embodiments and variations, part of the configurations achieved by hardware may be replaced with software, and conversely, part of the configurations achieved by software may be replaced with hardware.

Variation 10:

In the embodiments described above, an example of the configuration of the HMD has been presented. The configuration of the HMD can, however, be arbitrarily specified to the extent that the specified configuration does not depart from the substance of the present disclosure. For example, addition, omission, conversion, and any other modification of a component of the HMD can be performed.

In the embodiments described above, what is called a transmissive HMD 100, in which the right light guide plate 26 and the left light guide plate 28 transmit outside light, has been described. The present disclosure is, however also applicable, for example, to what is called a non-transmissive HMD 100, which displays an image with no transmission of the outside. In the case of the non-transmissive HMD 100, an image of the outside may be captured with a camera, and the captured image may be displayed in a display section. Further, these HMDs 100 not only allow AR (augmented reality) display operation described in the above embodiments in which an image is so displayed as to be superimposed on the real space but allow MR (mixed reality) display operation in which the combination of a captured real space image and an imaginary image is displayed or VR (virtual reality) display operation in which a virtual space is displayed.

In the embodiments described above, the functional portions of the control apparatus 10 and the image display section 20 have been described, and these functional portions can be arbitrarily changed. For example, the following aspects may be employed: an aspect in which the storage functional section 122 and the control functional section 150 are incorporated in the control apparatus 10 and the image display section 20 is equipped only with the display function; an aspect in which the storage functional section 122 and the control functional section 150 are incorporated in both the control apparatus 10 and the image display section 20; an aspect in which the control apparatus 10 and the image display section 20 are integrated with each other, in this case, for example, the components of the control apparatus 10 are all incorporated in the image display section 20 so that the image display section 20 is configured as a glasses-shaped wearable computer; an aspect in which the control apparatus 10 is replaced with a smartphone or a portable game console; and an aspect in which the control apparatus 10 and the image display section 20 are connected to each other over wireless communication with no connection cable 40, in this case, for example, electric power may also be wirelessly supplied to the control apparatus 10 and the image display section 20.

Variation 11:

In the embodiments described above, an example of the configuration of the control apparatus has been presented. The configuration of the control apparatus can, however, be arbitrarily specified to the extent that the specified configuration does not depart from the substance of the present disclosure. For example, addition, omission, conversion, and any other modification of a component of the control apparatus can be performed.

In the embodiments described above, an example of an input section provided as part of the control apparatus 10 has been described. The control apparatus 10 may instead be so configured that part of the input section presented by way of example is omitted or may include an input section different from the input section described above. For example, the control apparatus 10 may include an operation stick, a keyboard, a mouse, or any other component. For example, the control apparatus 10 may include an input section that interprets a command related to the user's body motion or any other motion. Detection of the user's body motion or any other motion can, for example, be sightline detection in which the sightline is detected and gesture detection in which hand motion is detected, or the user's body motion or any other motion can be acquired, for example, with a foot switch that detects foot motion. The sightline detection can, for example, be achieved with a camera that captures an image of the interior of the image display section 20. The gesture detection can, for example, be achieved by image analysis of images captured with the camera 61 over time.

In the embodiments described above, the control functional section 150 is activated when the main processor 140 executes the computer programs in the storage functional section 122. The control functional section 150 can instead be configured in a variety of other ways. For example, the computer programs may be stored, in place of the storage functional section 122 or in addition to the storage functional section 122, in the nonvolatile storage section 121, the EEPROM 215, the memory 118, and other external storage devices (including a USB memory and other storage devices inserted into a variety of interfaces and a server and other external apparatus connected over a network). The functions of the control functional section 150 may instead be achieved by using an ASIC (application specific integrated circuit) designed for achieving the functions.

Variation 12:

As a variation of the form in which the manual navigation mode is employed as the specific navigation mode, in a case where the unmanned aircraft 400 has entered the space separate from the HMD 100 by a distance smaller than or equal to L0, which is further smaller than L1, the relationship between the amount of operation inputted to the operation section 520 and the reaction of the unmanned aircraft 400 may be changed. The reaction of the unmanned aircraft 400 may, for example, be the amount of movement of the unmanned aircraft 400 or the range over which the moving speed of the unmanned aircraft 400 changes. The relationship described above may, for example, be so set that in a case where the maximum amount of operation is inputted to the joystick-type operation section 520, the amount of movement may be reduced or the speed is reduced as compared with the amount of movement or the speed in the relationship before the change. The configuration described above allows fine control of the unmanned aircraft 400 when the unmanned aircraft 400 enters the space separate from the HMD 100 by the distance smaller than or equal to L0, as compared with a case where the unmanned aircraft 400 is separate from the HMD 100 by an amount greater than L0.

Variation 13:

In the embodiments described above, an example of the configuration of the image display section has been presented. The configuration of the image display section can, however, be arbitrarily specified to the extent that the specified configuration does not depart from the substance of the present disclosure. For example, addition, omission, conversion, and any other modification of a component of the image display section can be performed.

Figure 29:
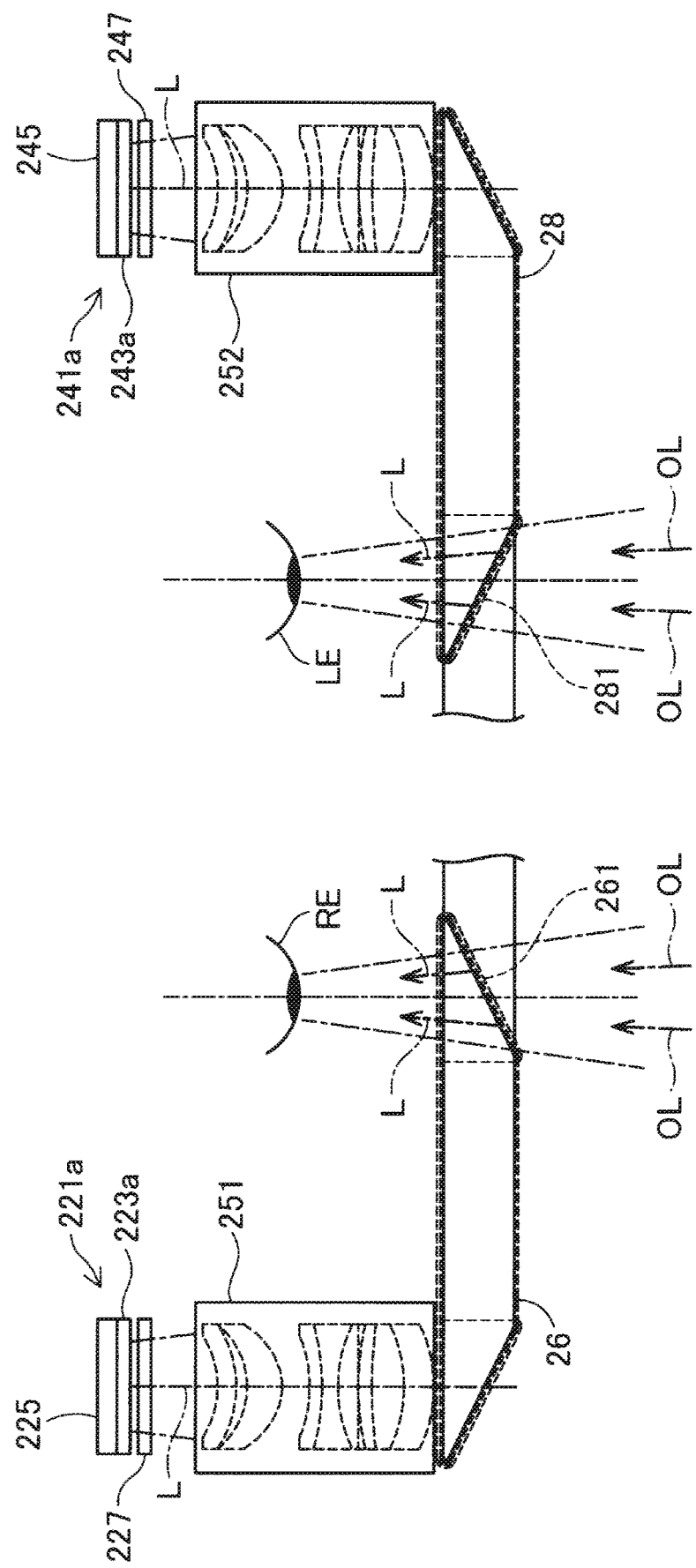
FIG. 29 is a key part plan view showing the configuration of an optical system provided in an image display section according to a variation.

FIG. 29 is a key part plan view showing the configuration of an optical system provided in an image display section according to a variation. The image display section according to the variation is provided with an OLED unit 221a corresponding to the user's right eye RE and an OLED unit 241a corresponding to the user's left eye LE. The OLED unit 221a corresponding to the right eye RE includes an OLED panel 223a, which emits white light, and the OLED drive circuit 225, which drives the OLED panel 223a to cause it to emit the light. A modulation element 227 (modulator) is disposed between the OLED panel 223a and the right optical system 251. The modulation element 227 is formed, for example, of a transmissive liquid crystal panel and modulates the light emitted from the OLED panel 223a to produce image light L. The modulated image light L having passed through the modulation element 227 is guided via the right light guide plate 26 to the right eye RE.

The OLED unit 241a corresponding to the left eye LE includes an OLED panel 243a, which emits white light, and the OLED drive circuit 245, which drives the OLED panel 243a to cause it to emit the light. A modulation element 247 (modulator) is disposed between the OLED panel 243a and the left optical system 252. The modulation element 247 is formed, for example, of a transmissive liquid crystal panel and modulates the light emitted from the OLED panel 243a to produce image light L. The modulated image light L having passed through the modulation element 247 is guided via the left light guide plate 28 to the left eye LE. The modulation elements 227 and 247 are connected to a liquid crystal driver circuit that is not shown. The liquid crystal driver circuit (modulator driver) is mounted, for example, on a substrate disposed in the vicinity of the modulation elements 227 and 247.

According to the image display section of the variation, the right display unit 22 and the left display unit 24 are configured as video elements including the OLED panels 223a and 243a, which each serve as a light source section, and the modulation elements 227 and 247, which modulate light emitted from the light source sections and output image light containing a plurality of color light fluxes. The modulators, which modulate the light emitted from the OLED panels 223a and 243a, do not necessarily have the configuration in which a transmissive liquid crystal panel is employed. For example, a reflective liquid crystal panel may be used in place of each of the transmissive liquid crystal panels, or a digital micromirror device may be used. A laser-retina-projection-type HMD 100 may even be employed.

In the embodiments described above, the glasses-shaped image display section 20 has been described, and the form of the image display section 20 can be arbitrarily changed. For example, the image display section 20 may be so formed as to be mounted as a cap or may be so formed as to be built in a helmet or any other body protection gear. The image display section 20 may still instead be configured as an HUD (head-up display) incorporated in an automobile, an airplane, or any other vehicle, or any other transportation apparatus.

In the embodiments described above, the configuration in which the half-silvered mirrors 261 and 281 form virtual images in part of the right light guide plate 26 and the left light guide plate 28 is presented as an example of the optical system that guides image light to the user's eyes. The configuration can, however, be arbitrarily changed. For example, a virtual image may be formed in a region that occupies the entirety (or majority) of each of the right light guide plate 26 and the left light guide plate 28. In this case, the size of the image may be reduced by the action of changing the position where the image is displayed. Further, the optical elements in the embodiments of the present disclosure are not limited to the right light guide plate 26 and the left light guide plate 28 including the half-silvered mirrors 261 and 282, and an arbitrary aspect can be employed as long as optical parts that cause the image light to enter the user's eyes (diffraction grating, prism, or holographic element, for example) are used.

The present disclosure is not limited to the embodiments, examples, and variations described above and can be implemented in a variety of other configurations to the extent that the other configurations do not depart from the substance of the present disclosure. For example, to solve part or entirety of the problems described above or to achieve part or entirety of the advantageous effects described above, the technical features in the embodiments, examples, and variations corresponding to the technical features in the forms described in the SUMMARY section can be swapped or combined with each other as appropriate. Further, in a case where the technical features are not described as essential features in the present specification, they can be deleted as appropriate.

The entire disclosure of Japanese Patent Application No.: 2017-062099, filed Mar. 28, 2017 and 2017-209970, filed Oct. 31, 2017 are expressly incorporated by reference herein.

What is claimed is:

1. A head mounted display that controls remote maneuver of a vehicle, the head mounted display comprising:
a display section that is a see-through-type display;
a global navigation satellite system (GNSS) information acquisition section that acquires a GNSS information;
a communication section capable of performing communication using wireless communication with the vehicle; and
a control section,
wherein the control section
evaluates whether or not the vehicle has entered a visual field visually recognizable by a user's eye through the display section in a case where the vehicle travels in an automatic navigation mode in which the vehicle moves toward a position indicated by the GNSS information, and
causes the vehicle to terminate the travel in the automatic navigation mode but travel in a specific navigation mode different from the automatic navigation mode in a case where the control section determines that the vehicle has entered the visual field,
wherein the communication section acquires a vehicle image that is an image captured by the vehicle from the vehicle over wireless communication, the display section is a display section that allows see-through visual recognition of an outside scene, performs display operation in a first aspect in a case where a maneuver distance that is a distance from the head mounted display to the vehicle is greater than a second distance, and
performs display operation in a second aspect in a case where the maneuver distance is smaller than the second distance, and the display operation in the first and second aspects includes displaying the vehicle image.

2. The head mounted display according to claim 1,
further comprising a camera that captures an image of the visual field,
wherein the control section acquires the image captured with the camera and performs pattern matching between a target image prepared in advance to identify the vehicle and the captured image to evaluate whether or not the vehicle has entered the visual field.

3. The head mounted display according to claim 1,
wherein the GNSS information acquisition section includes a GNSS receiver that receives the GNSS information, and
the automatic navigation mode is a navigation mode that allows the vehicle to home to the head mounted display.

4. The head mounted display according to claim 1,
wherein the GNSS information acquisition section receives the GNSS information from a GNSS receiver provided in a position separate from the head mounted display.

5. The head mounted display according to claim 1,
further comprising a radio wave receiver that receives a radio wave sent from the vehicle,
wherein the specific navigation mode is a mode in which intensity of the radio wave received by the radio wave receiver is measured and a travel route is specified from a change in the measured intensity.

6. The head mounted display according to claim 1,
wherein the vehicle includes an inertial sensor that detects motion of an airframe and successively accumulates a detection value from the inertial sensor to determine a position of the airframe, and
the specific navigation mode is a mode in which the head mounted display acquires the position of the airframe determined by the vehicle and a travel route is specified from the acquired position of the airframe.

7. The head mounted display according to claim 6,
wherein the inertial sensor is a first inertial sensor,
the head mounted display further comprises a second inertial sensor that detects motion, and
the specific navigation mode is a mode in which the head mounted display successively accumulates a detection value from the second inertial sensor to determine a position of the head mounted display and the travel route is specified from the determined position of the head mounted display and the acquired position of the airframe.

8. The head mounted display according to claim 1,
further comprising an operation section that instructs, when operated by a user, the vehicle about motion thereof,
wherein the specific navigation mode is a mode in which the head mounted display specifies a travel route in accordance with the instruction issued to the operation section.

9. The head mounted display according to claim 8,
wherein the display section is a display section that allows see-through visual recognition of an outside scene, and
the control section causes the display section to display an operation screen for the operation section, estimates a position of the vehicle on the display section when the control section determines that the vehicle has entered the visual field, and moves the operation screen to a position separate from the estimated position.

10. The head mounted display according to claim 1,
the display section performs display operation in a second aspect in a case where the maneuver distance is greater than a first distance, and performs display operation in a third aspect in a case where the maneuver distance is smaller than the first distance, and
the display operation in the third aspects includes displaying the vehicle image.

11. The head mounted display according to claim 10,
wherein an area in which the vehicle image is displayed in the display operation in the second aspect is narrower than an area in which the vehicle image is displayed in the display operation in the first aspect.

12. The head mounted display according to claim 10,
wherein the display operation in the first aspect includes displaying an object showing that the display operation in the first aspect is performed,
the display operation in the second aspect includes displaying an object showing that the display operation in the second aspect is performed, and
the display operation in the third aspect includes displaying an object showing that the display operation in the third aspect is performed.

13. The head mounted display according to claim 10,
wherein the control section sets at least one of the first and second distances based on a relationship between the vehicle and a background color of surroundings of the vehicle.

14. The head mounted display according to claim 10,
wherein the maneuver distance being smaller than or equal to the first distance is a necessary condition of determination of entry of the vehicle into the visual field visually recognizable through the display section, and
the control section instructs the vehicle to hover in a current position until the travel in the specific navigation mode starts in a case where the travel in the automatic navigation mode shortens the maneuver distance from a distance greater than the first distance to the first distance.

15. The head mounted display according to claim 10,
wherein the control section instructs the vehicle to travel in the automatic navigation mode so that the maneuver distance is shortened in a case where the maneuver distance increases from a distance smaller than or equal to the first distance to a distance greater than the first distance.

16. The head mounted display according to claim 10,
wherein the vehicle is formed of a plurality of vehicles, and the control section is capable of instructing the plurality of vehicles about the navigation mode.

17. The head mounted display according to claim 16,
further comprising an operation section that instructs, when operated by a user, the vehicles about motion thereof,
wherein the control section causes the display section to display an operation screen for the operation section,
the specific navigation mode is a mode in which the head mounted display specifies a travel route in accordance with the instruction issued to the operation section, and
in a case where there are a plurality of vehicles each satisfying a condition that the maneuver distance is smaller than or equal to the first distance, the control section selects one of the plurality of vehicles as a selected vehicle that is a vehicle the travel route of which is specified in accordance with the instruction issued to the operation section.

18. The head mounted display according to claim 17,
wherein the control section instructs, out of the vehicles each satisfying the condition that the maneuver distance is smaller than or equal to the first distance, vehicles other than the selected vehicle to hover.

19. The head mounted display according to claim 17,
wherein the control section instructs, out of the vehicles each satisfying the condition that the maneuver distance is smaller than or equal to the first distance, vehicles other than the selected vehicle to follow the selected vehicle.

20. The head mounted display according to claim 17,
wherein the display section displays an image for distinguishing the selected vehicle from vehicles other than the selected vehicle as the display operation in the third aspect.

21. The head mounted display according to claim 20,
wherein the vehicles other than the selected vehicle include a vehicle to be maneuvered by the head mounted display and a vehicle not to be maneuvered by the head mounted display, and
the display section displays an image for distinguishing the vehicle to be maneuvered by the head mounted display from the vehicle not to be maneuvered by the head mounted display as display operation in the third aspect.

22. The head mounted display according to claim 10,
wherein the control section accepts from a user an input of a destination in the specific navigation mode and instructs the vehicle to head toward the destination.

23. A method for maneuvering a vehicle using a head mounted display, the display having a see-through-type display, the method comprising:
causing the head mounted display to evaluate whether or not the vehicle has entered a visual field visually recognizable by a user's eye through the see-through-type display of the head mounted display in a case where the vehicle travels in an automatic navigation mode in which the vehicle moves toward a position indicated by global navigation satellite system (GNSS) information,
causing the head mounted display to cause the vehicle to terminate the travel in the automatic navigation mode but travel in a specific navigation mode different from the automatic navigation mode in a case where the head mounted display determines that the vehicle has entered the visual field;
acquiring a vehicle image that is an image captured by the vehicle from the vehicle over wireless communication; and
causing the head mounted display to allow see-through visual recognition of an outside scene, perform display operation in a first aspect in a case where a maneuver distance that is a distance from the head mounted display to the vehicle is greater than a second distance, and perform display operation in a second aspect in a case where the maneuver distance is smaller than the second distance,
wherein the display operation in the first and second aspects includes displaying the vehicle image.

* * * * *